W. C. HUEBNER.
PHOTOGRAPHIC PRINTING APPARATUS.
APPLICATION FILED AUG. 6, 1918.
1,377,249. Patented May 10, 1921.
12 SHEETS—SHEET 8.
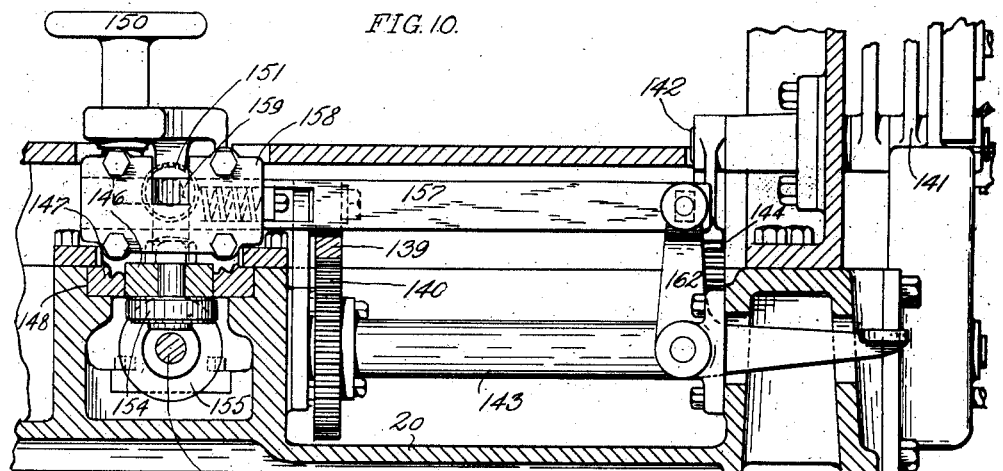
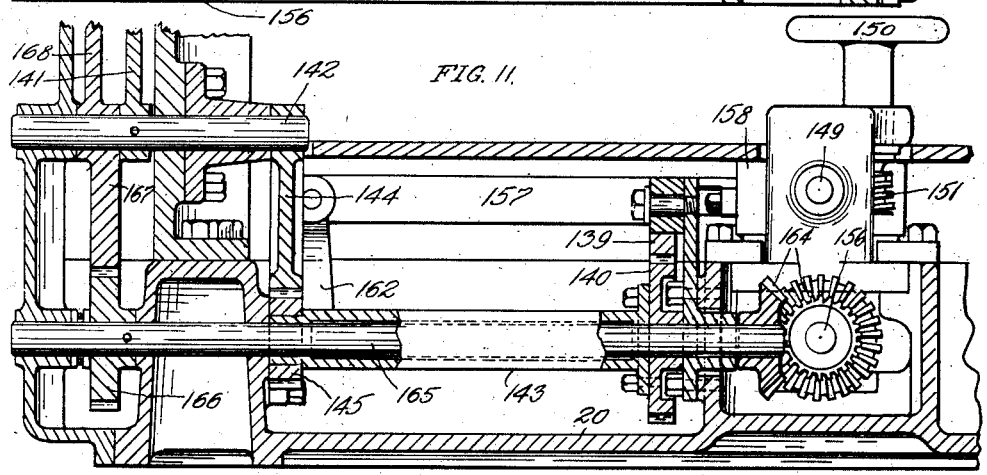
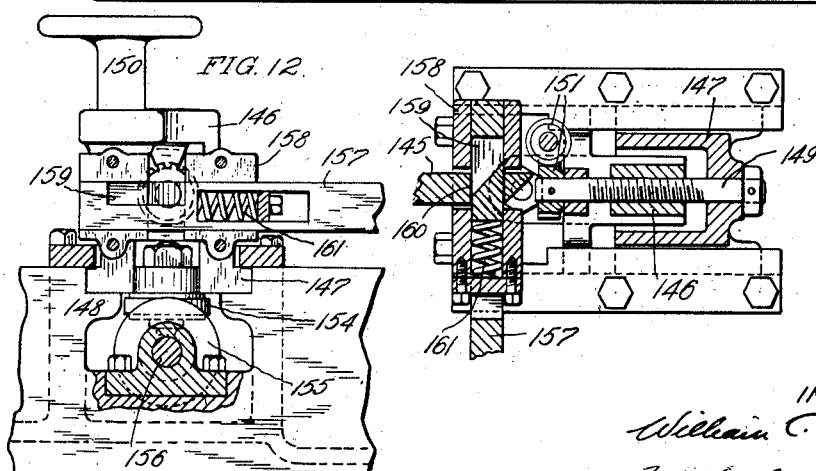
INVENTOR.
William C. Huebner,
By Wilhelm & Parker
ATTORNEYS.

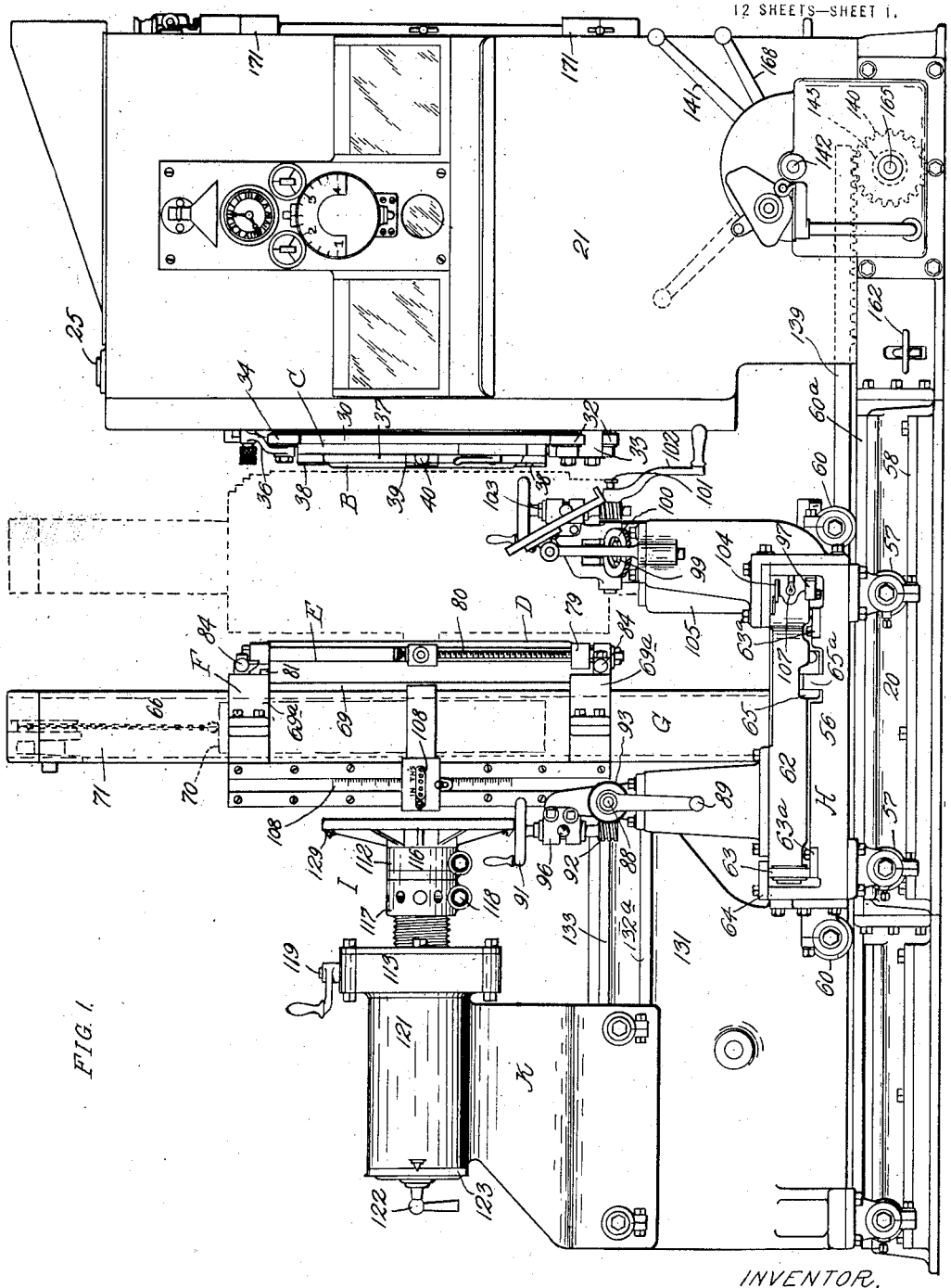

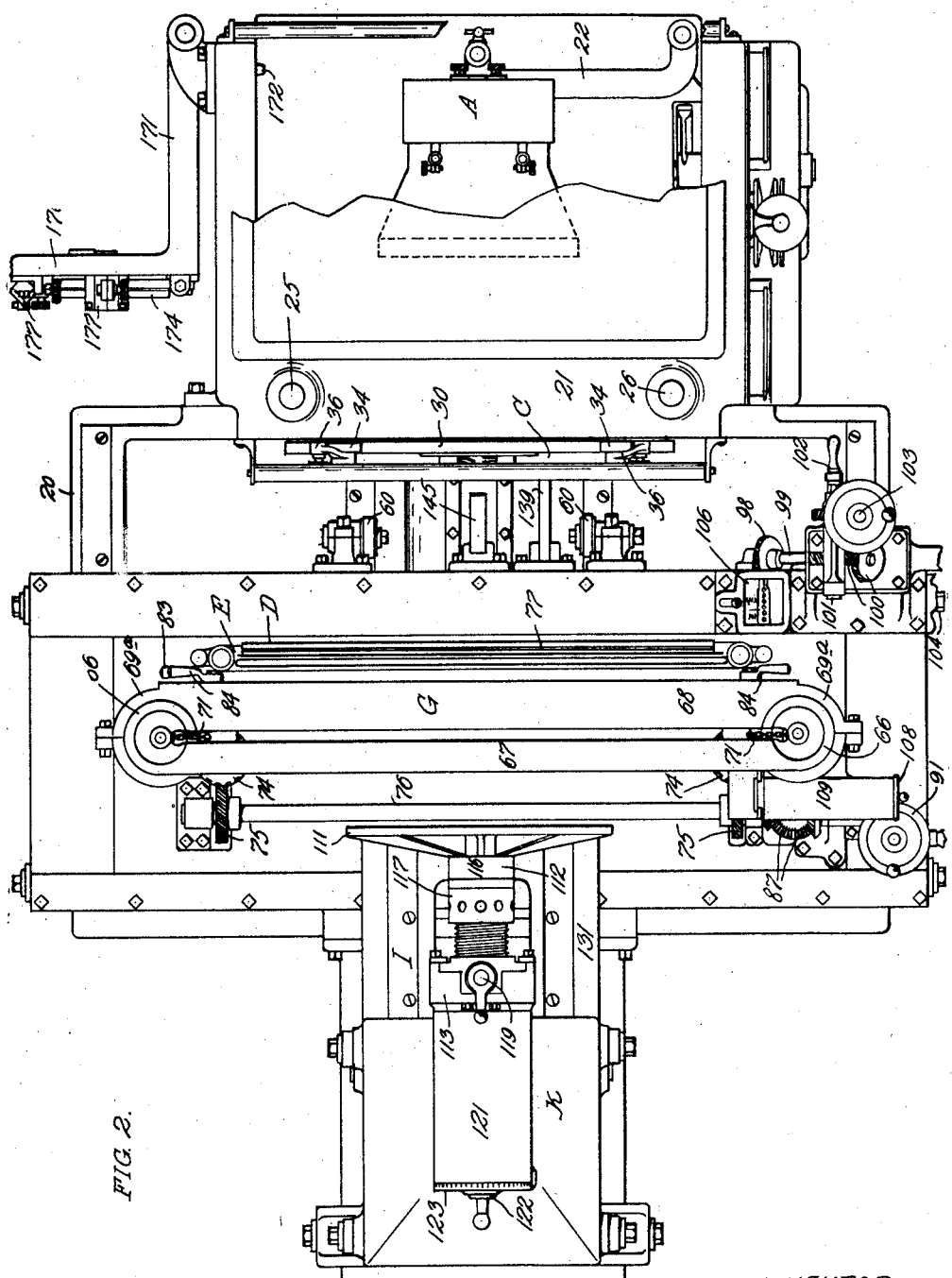

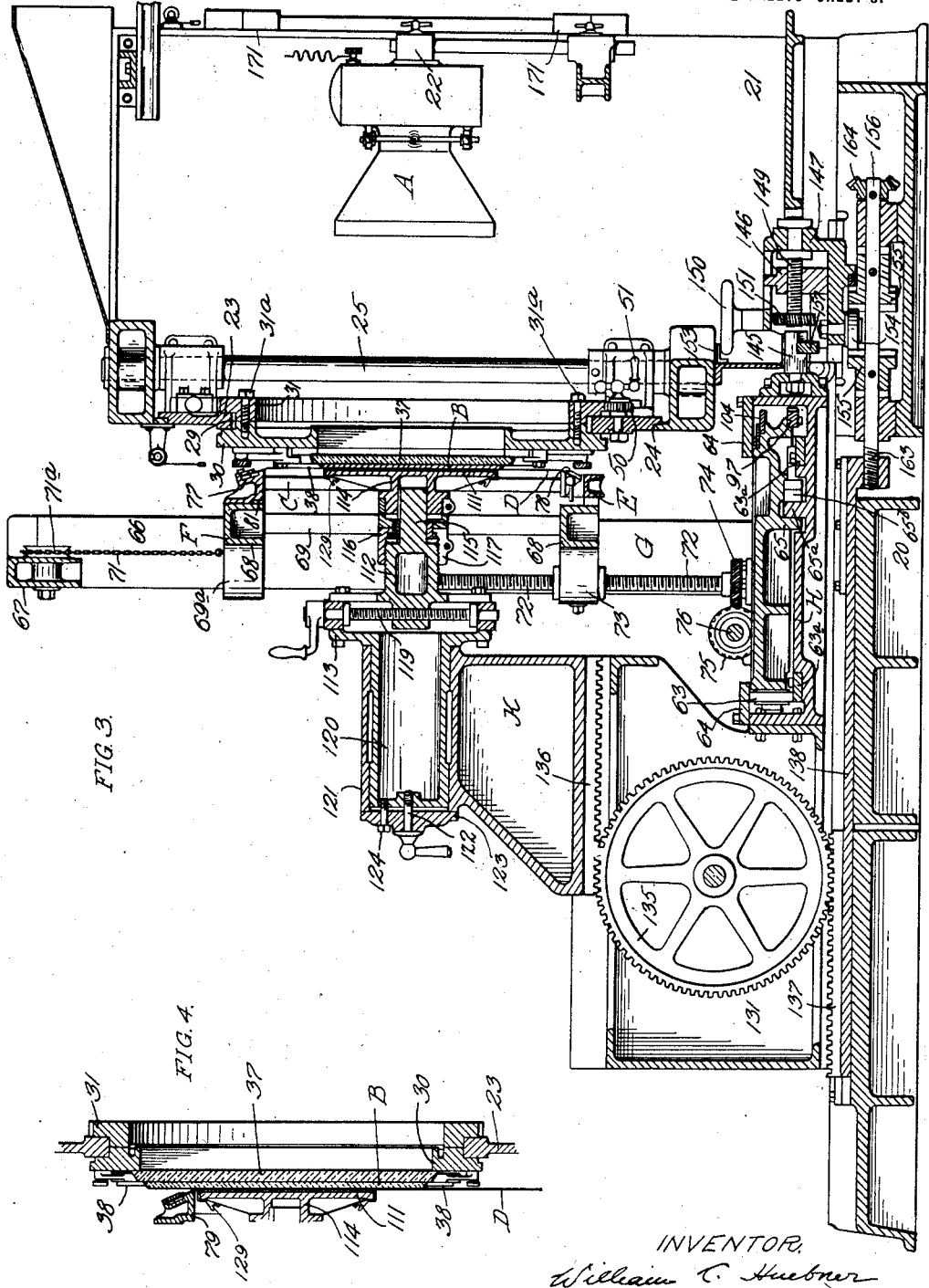

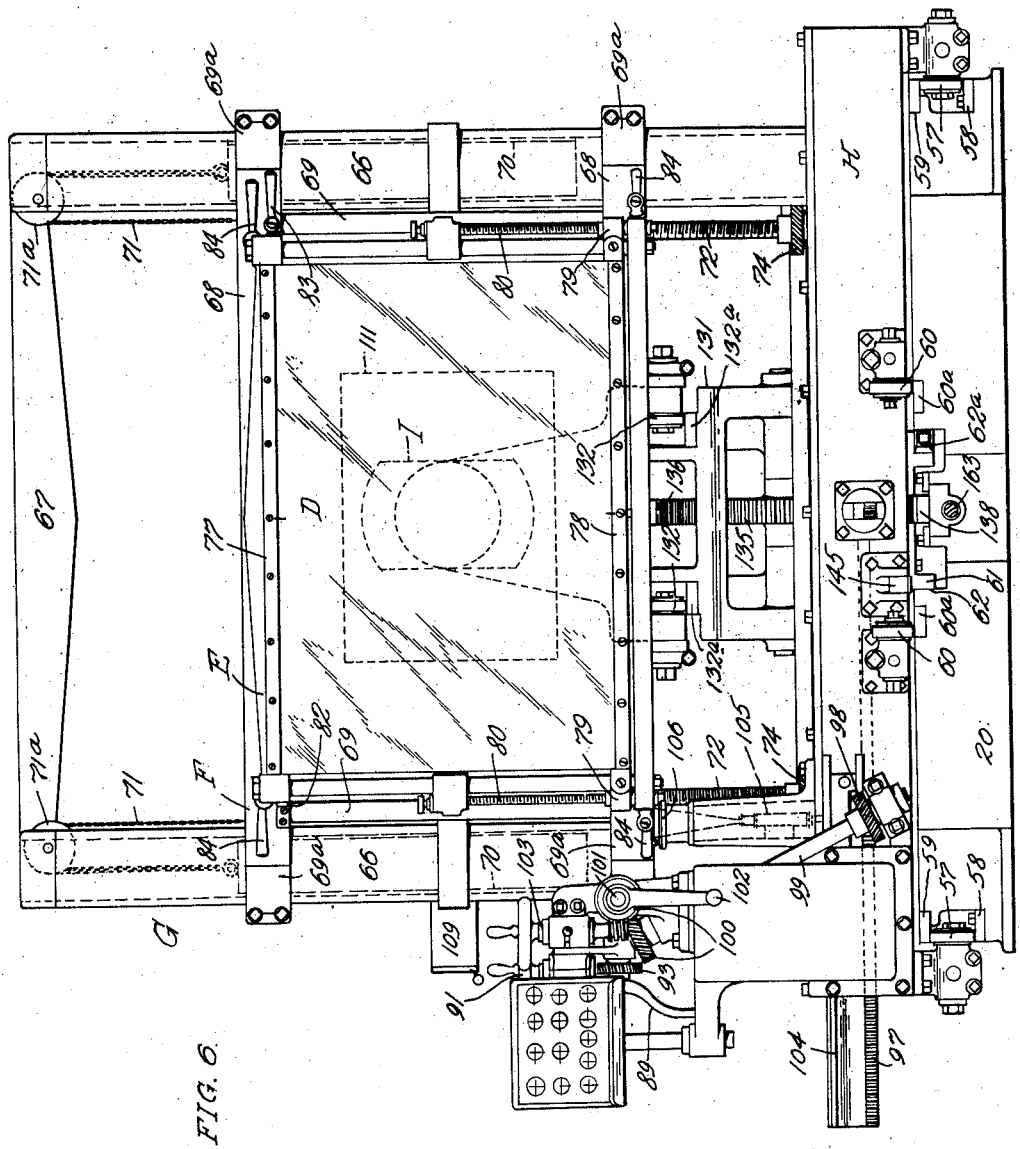

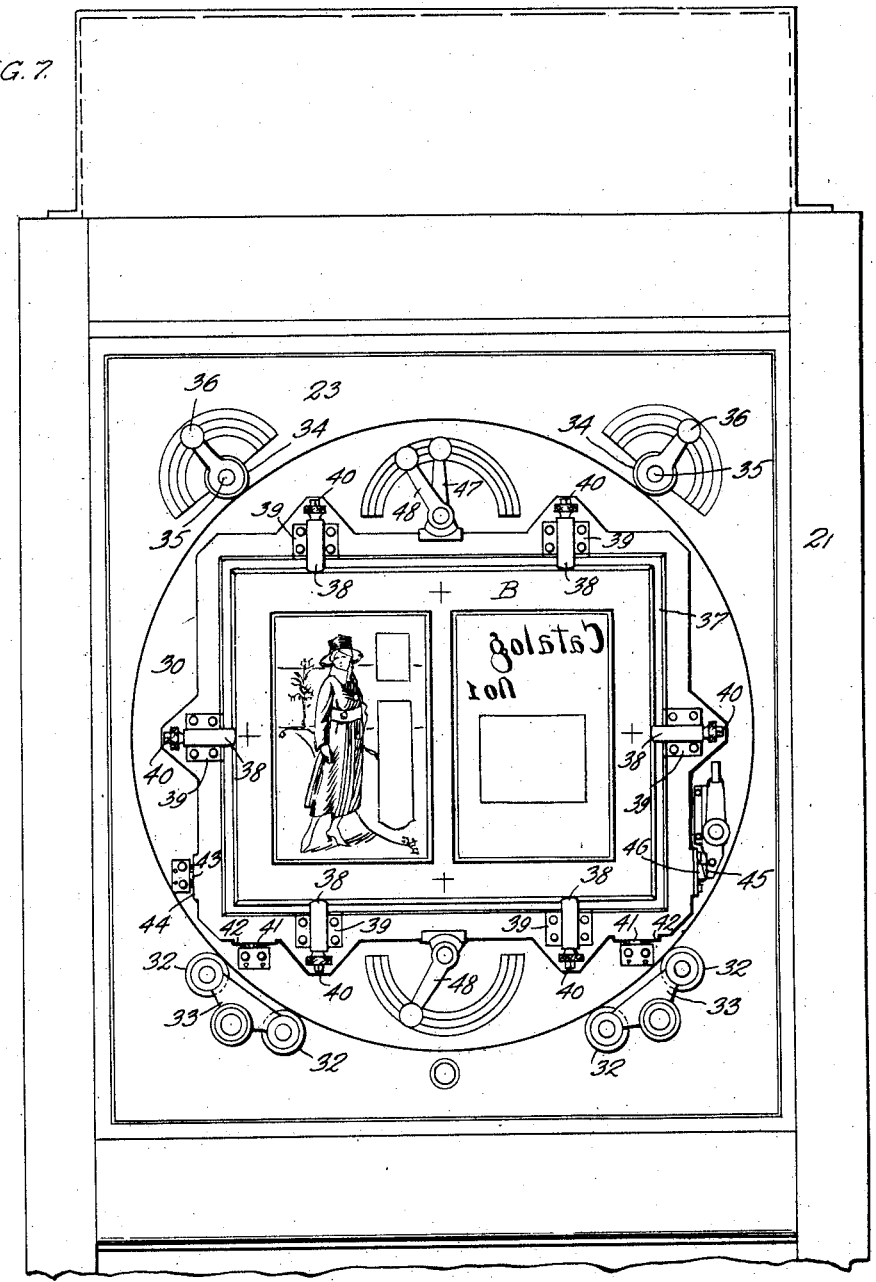

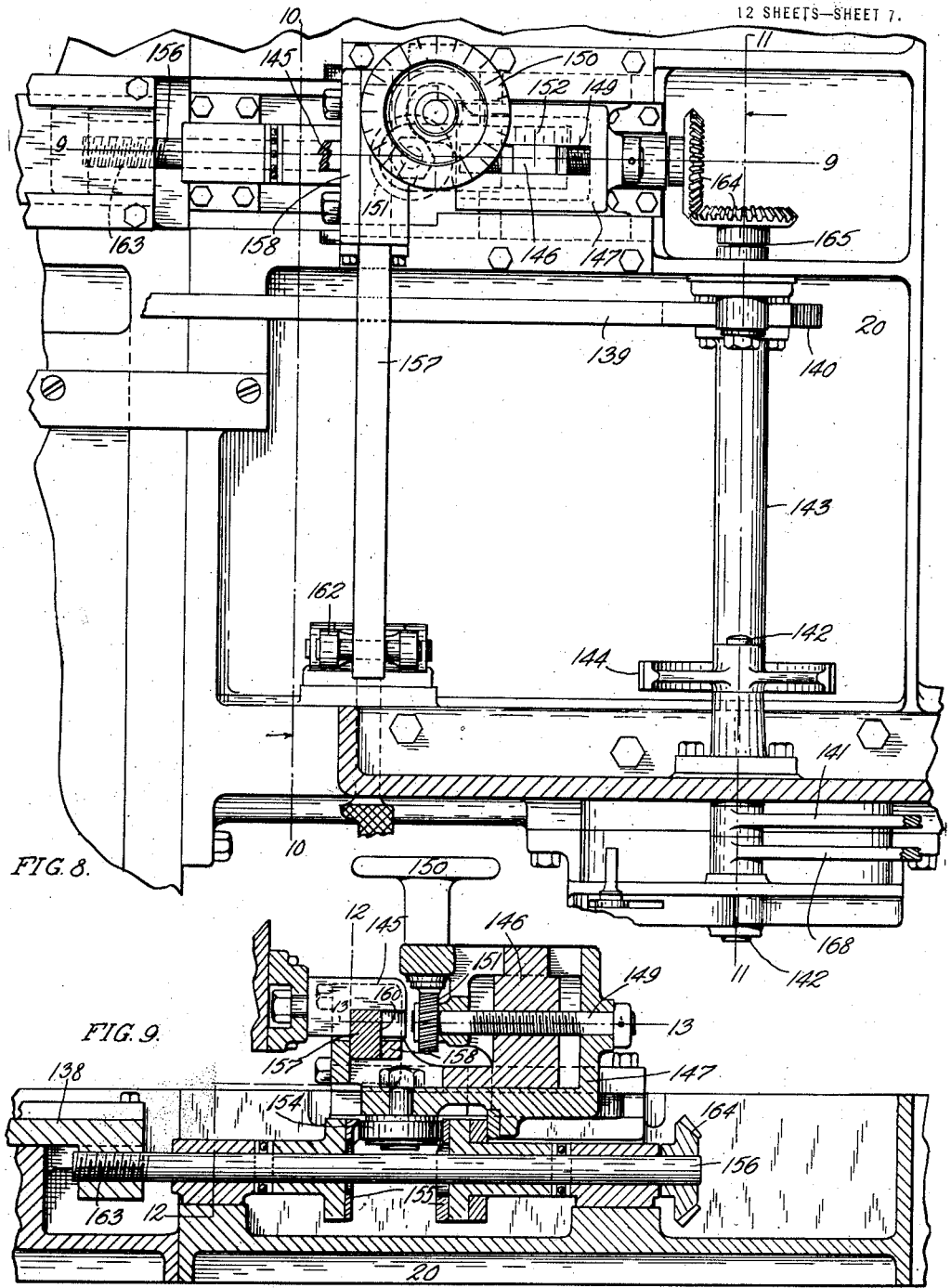

W. C. HUEBNER.
PHOTOGRAPHIC PRINTING APPARATUS.
APPLICATION FILED AUG. 6, 1918.

1,377,249.

Patented May 10, 1921.
12 SHEETS—SHEET 9.

INVENTOR.
William C. Huebner,
by Wilhelm & Parker
ATTORNEYS.

W. C. HUEBNER.
PHOTOGRAPHIC PRINTING APPARATUS.
APPLICATION FILED AUG. 6, 1918.
1,377,249.
Patented May 10, 1921.
12 SHEETS—SHEET 10.
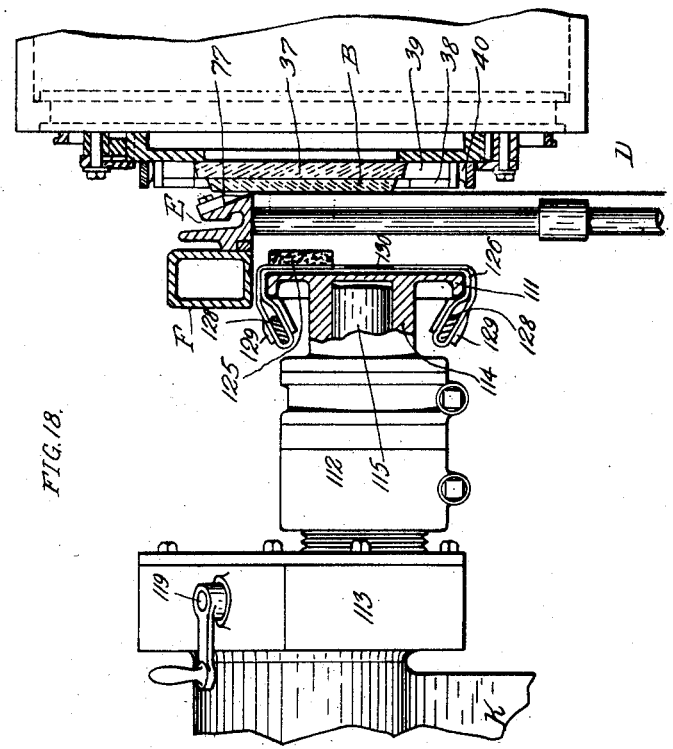
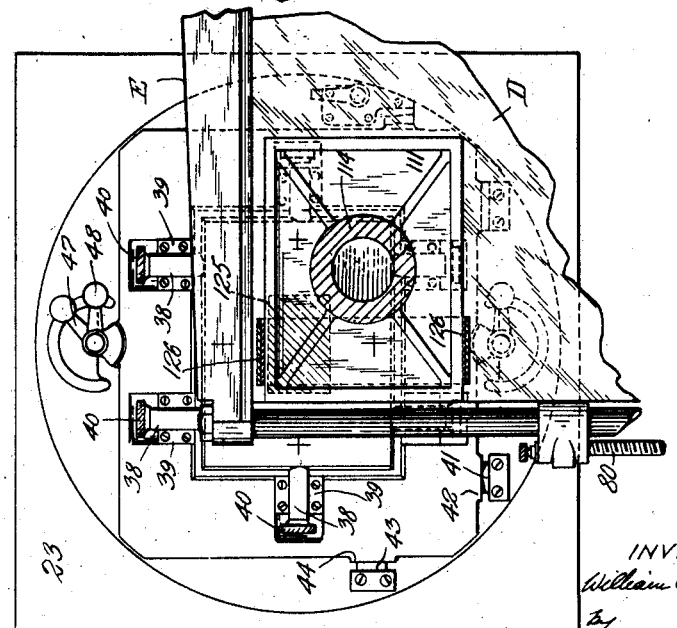
INVENTOR.
William C. Huebner
By
Wilhelm & Parker
ATTORNEYS.

W. C. HUEBNER.
PHOTOGRAPHIC PRINTING APPARATUS.
APPLICATION FILED AUG. 6, 1918.

1,377,249.

Patented May 10, 1921.
12 SHEETS—SHEET 11.

INVENTOR.
William C. Huebner
by Wilhelm & Parker.
ATTORNEYS.

W. C. HUEBNER.
PHOTOGRAPHIC PRINTING APPARATUS.
APPLICATION FILED AUG. 6, 1918.
1,377,249.
Patented May 10, 1921.
12 SHEETS—SHEET 12.
FIG. 21.
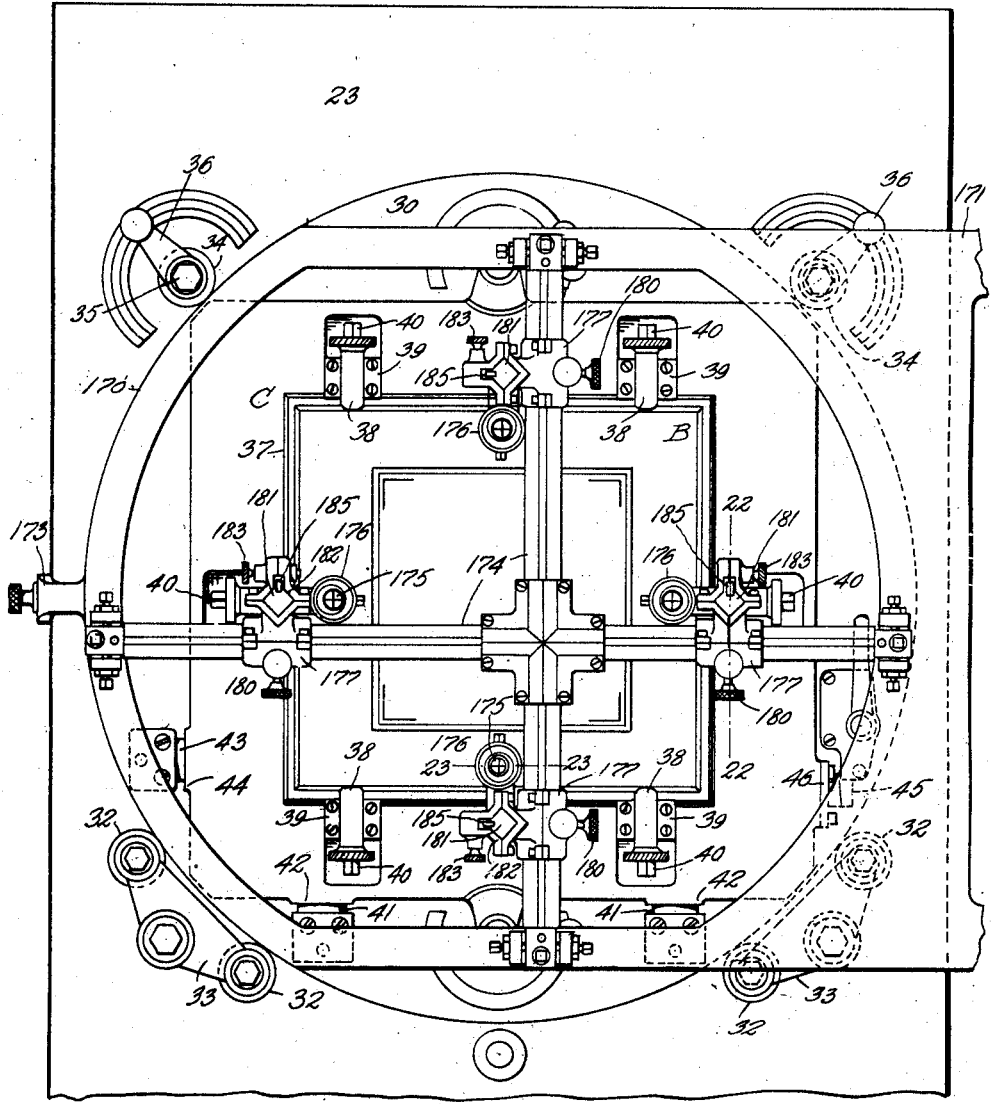
FIG. 22.
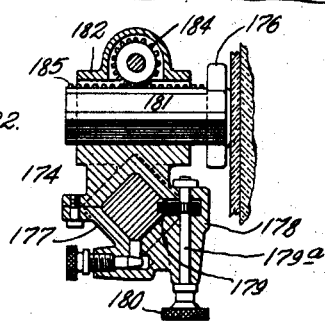
FIG. 23.
INVENTOR.
William C. Huebner,
by Wilhelm & Parker,
ATTORNEYS.

UNITED STATES PATENT OFFICE.

WILLIAM C. HUEBNER, OF BUFFALO, NEW YORK, ASSIGNOR TO HUEBNER BLEISTEIN PATENTS CO., OF BUFFALO, NEW YORK.

PHOTOGRAPHIC-PRINTING APPARATUS.

1,377,249.   Specification of Letters Patent.   Patented May 10, 1921.

Application filed August 6, 1918. Serial No. 248,623.

*To all whom it may concern:*

Be it known that I, WILLIAM C. HUEBNER, a citizen of the United States, residing at Buffalo, in the county of Erie and State of New York, have invented a new and useful Improvement in Photographic-Printing Apparatus, of which the following is a specification.

This invention relates more particularly to photographic printing or composing apparatus for photographing original prints directly in predetermined and registered locations upon the sensitized surfaces of printing press plates which are afterward suitably finished and used in mechanical printing machines for printing in one or more colors.

Apparatus of this nature are disclosed in various patents granted to me, for instance, Patents Numbers 954,291 and 954,292, granted April 5, 1910, to myself and George Bleistein and Number 1,201,048, granted Oct. 10, 1916 to myself, assignor to Huebner-Bleistein Patents Co. These apparatus are adapted for producing photographically upon the sensitized press plate any desired number of like or different prints in any desired position or relative arrangement. For instance, the apparatus are adapted for repeating prints from the same transparent printing plate or negative in a desired arrangement on a single sensitized press plate which is afterward used for printing a plurality of impressions, and also for composing purposes where it is desired to place different subjects in a predetermined arrangement on the press plate. The apparatus are also adapted for making press plates for multi-color printing where it is necessary to photograph the prints in exact register on different sensitized plates that are used for printing the different colors.

Such apparatus comprise a support for the sensitized press plate, a light chamber or support arranged to support a transparent photographic negative or printing plate, hereinafter called the "printing plate," in front of the sensitized surface of the press plate, a back support or pressure device for the sensitized plate for insuring a tight uniform contact of the sensitized surface with the printing plate, means for causing the passage of light through the printing plate for photographing the print on the sensitized plate, and means for effecting a relative movement between the sensitized plate and the printing plate parallel with the sensitized surface to enable the prints to be made in desired predetermined and registered locations and positions on the sensitized plate.

The object of this invention is to improve photographic printing apparatus of this kind in the various respects hereinafter particularly described and set forth in the claims, whereby photographic prints can be made on sensitized press plates rapidly and with the minimum labor and with great precision in any desired or necessary relative arrangement and position, so as to enable press plates for various different kinds of work to be prepared in a commercially practical and economical manner.

In the accompanying drawings:

Figure 1 is a side elevation of a photographic printing machine embodying the invention.

Fig. 2 is a plan view thereof.

Fig. 3 is a longitudinal sectional elevation thereof showing the parts in printing position.

Fig. 4 is a similar fragmentary sectional elevation showing a different printing adjustment of the sensitized plate and pressure device.

Fig. 6 is an end elevation thereof, with the light chamber removed.

Fig. 7 is a face view of the light chamber showing the index head and printing plate holder.

Fig. 8 is a sectional plan view on an enlarged scale, showing the limit stop and catch mechanism for the main printing plate carriage.

Fig. 9 is a longitudinal sectional elevation thereof on line 9—9, Fig. 8.

Figs. 10 and 11 are transverse sectional elevations thereof on lines 10—10 and 11—11, respectively, Fig. 8.

Fig. 12 is a sectional elevation thereof on line 12—12, Fig. 9, the catch being disengaged.

Fig. 13 is a sectional plan view on line 13—13, Fig. 9.

Figure 14:
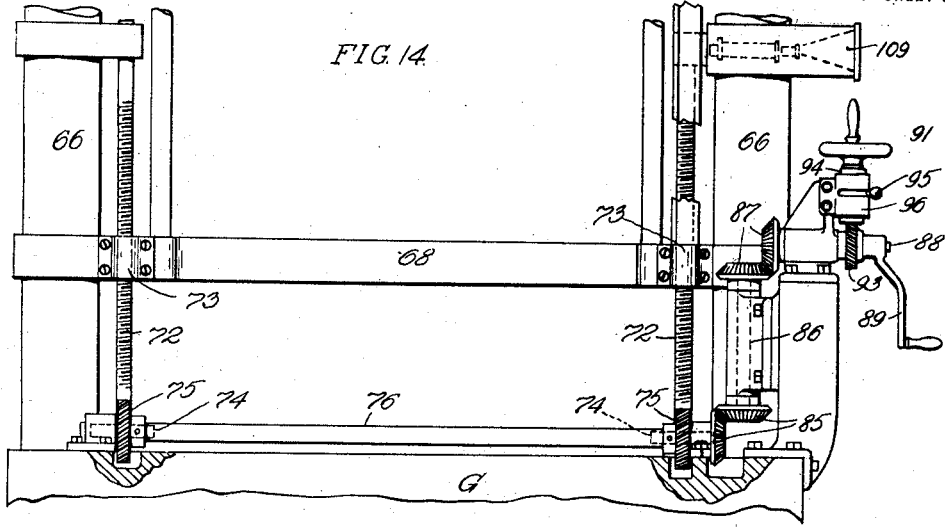

Fig. 14 is a fragmentary transverse elevation, partly in section of the auxiliary carriage.

Figure 15:
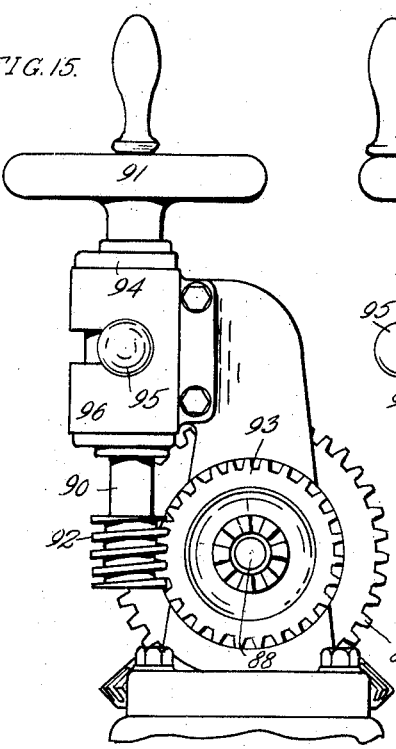

Fig. 15 is an enlarged side elevation of the coarse and fine adjusting mechanism for the carrying frame.

Figure 16:
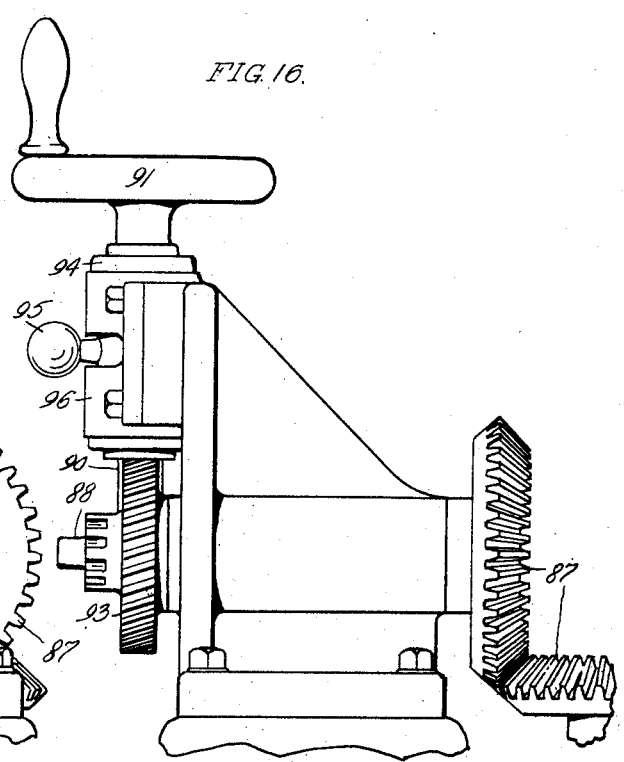

Fig. 16 is a front elevation thereof.

Fig. 17 is a transverse sectional elevation showing one of the possible adjustments of the holders for the printing and sensitized plate, and the pressure device, and also illustrating the use of the supplemental pressure block.

Fig. 18 is a longitudinal sectional elevation thereof.

Figure 19:
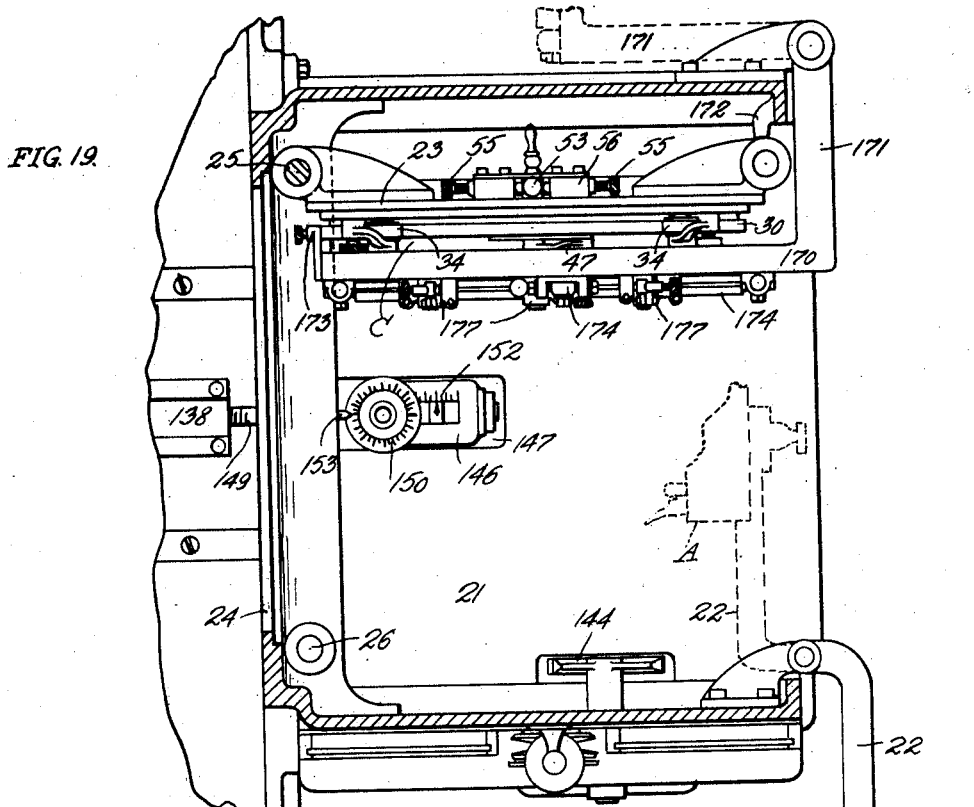

Fig. 19 is a sectional plan of the light chamber showing the swinging head and centering device in position for centering the printing plate.

Figure 20:
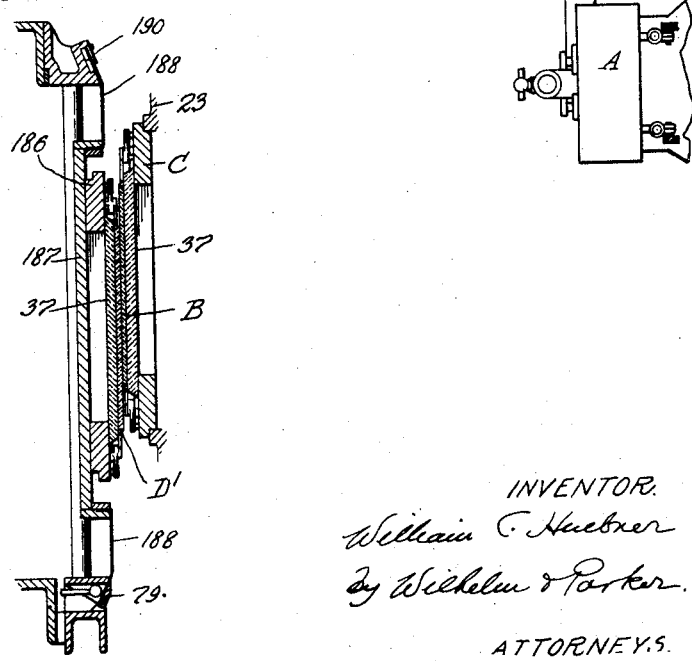

Fig. 20 is a sectional elevation showing a holder for a glass sensitized or print receiving plate.

Fig. 21 is a face view of the swinging head and centering device in the position shown in Fig. 19.

Figs. 22 and 23 are sections on lines 22—22 and 23—23, respectively, Fig. 21.

The machine or apparatus disclosed in the drawings is constructed as follows:—

20 represents a stationary horizontal base of any suitable construction and 21 is a stationary upright frame portion or support which is rigid with the base 20 and is preferably hollow, thus forming a light chamber or housing for the lamp A which illuminates the printing plate B. The lamp is mounted on a swinging bracket 22 by which it can be swung to and from the operative position in the housing 21 shown in Figs. 2 and 3. 23 represents a swinging head or support on which the printing plate B is mounted and which is suitably hinged in the housing 21 to swing to and from an operative position in an opening 24 in the inner side of the housing 21. The swinging head is hinged at one side, as by an upright rod 25 in the housing 21 and is provided with suitable means such as bolts 26 adapted to enter keepers on the housing at the top and bottom of the swinging head for locking the head in its operative position. These bolts are connected by links 27, Fig. 5, to a lever 28 by which the two bolts are operated simultaneously. The swinging head is provided with a circular opening 29 in which is mounted and adapted to be adjusted rotatably an index head which carries the holder C for the printing plate. The index head preferably consists of a circular disk 30 and a gear ring 31 which are disposed at opposite sides of the vertical plate forming the swinging head and are rigidly connected as by bolts 31ª. The disk 30 has an opening therethrough large enough for the passage of light to illuminate all parts of the largest printing plate for which the machine is adapted. The index head is rotatably supported in the opening 29 by rollers 32 on which the circular edge of the disk 30, which is ground to a true circle, bears and is adapted to roll. The rollers 32 are preferably journaled in pairs on rocking supports 33 which are pivoted between their ends on the swinging head at the lower side of the opening 29. The rocking supports for the rollers 32 permit the rollers to adjust themselves to the circular edge of the index head. The index head is held in rolling contact with the supporting rollers and prevented from being moved out of engagement therewith by two rollers 34 which bear against the upper portion of the circular edge of the index head. These rollers are preferably journaled on studs 35 which are eccentrically journaled on the swinging head and are turned by levers 36 to move the rollers into contact with the circular edge of the index head. In this way the index head is held firmly in rolling contact with the supporting rollers 32 and 34 so as to rotate freely without the possibility of being shifted out of the intended centered position.

The holder C for the printing plate is preferably removably secured on the index head so that the holder with the printing plate in position thereon can be quickly and easily placed in and removed from the machine and one holder with its printing plate replaced by another holder carrying a different printing plate. This plate holder consists of a rectangular metal frame carrying a fixed glass or transparent supporting plate 37 on the face of which the printing plate is adjustably secured by suitable jaws or securing devices 38. The jaws 38 engage the beveled edges of the printing plate and slide toward and from the printing plate on blocks 39 which are secured, as by screws, on the plate holder and also serve to secure the supporting plate 37 stationarily on the holder frame. The jaws are moved to engage and release the printing plate by operating screws 40. There are preferably six of the holding jaws 38, two arranged at diametrically opposite points of the printing plate and two arranged at each of the other two edges of the printing plate. The ends of the jaws which engage the beveled edges of the negative are beveled and rounded so as to permit the printing plate to be shifted and adjusted angularly or rotatably to a limited extent on the plate holder in order that the printing plate can be centered accurately with reference to the center of rotation of the plate holder and index head.

For securing the plate holder C on the index head with the center of the negative exactly coincident with the center of rotation of the index head, the latter is provided below its light opening with two hardened steel blocks or bearings 41 on which bearing faces 42 on the lower edge of the plate holder are adapted to rest, and with a similar block 43 against which a bearing 44 on one end of the plate holder is adapted to bear. When the plate holder has been placed on the two lower blocks 43 it is forced over to and held firmly against the side block 43 by suitable means, such as a lever actuated wedge 45 on the index head adapted to be moved against an inclined hardened face or projection 46 on the adjacent end of the plate holder. In this way the plate holder or different plate holders are always secured accurately in the same position on the index head. The plate holder is held down firmly on the supporting blocks 41 by a suitable cam lever 47 adapted to engage the upper edge of the plate holder, and the plate holder is forced and firmly held flat against the face of the index head by levers 48 provided with inclined faces which engage outwardly facing portions at the upper and lower edges of the plate holder.

It will be seen from Figs. 1 and 4 that the holding jaws 38 for the printing plate and their operating screws, as well as all other parts on the plate holder and index head are disposed below or back of the plane of the outer face of the printing plate so that the sensitized plate D can be placed in contact with the face of the printing plate in any adjustment of the sensitized plate without interference by or contact with any part of the printing plate holder or its supporting means.

Figure 5:
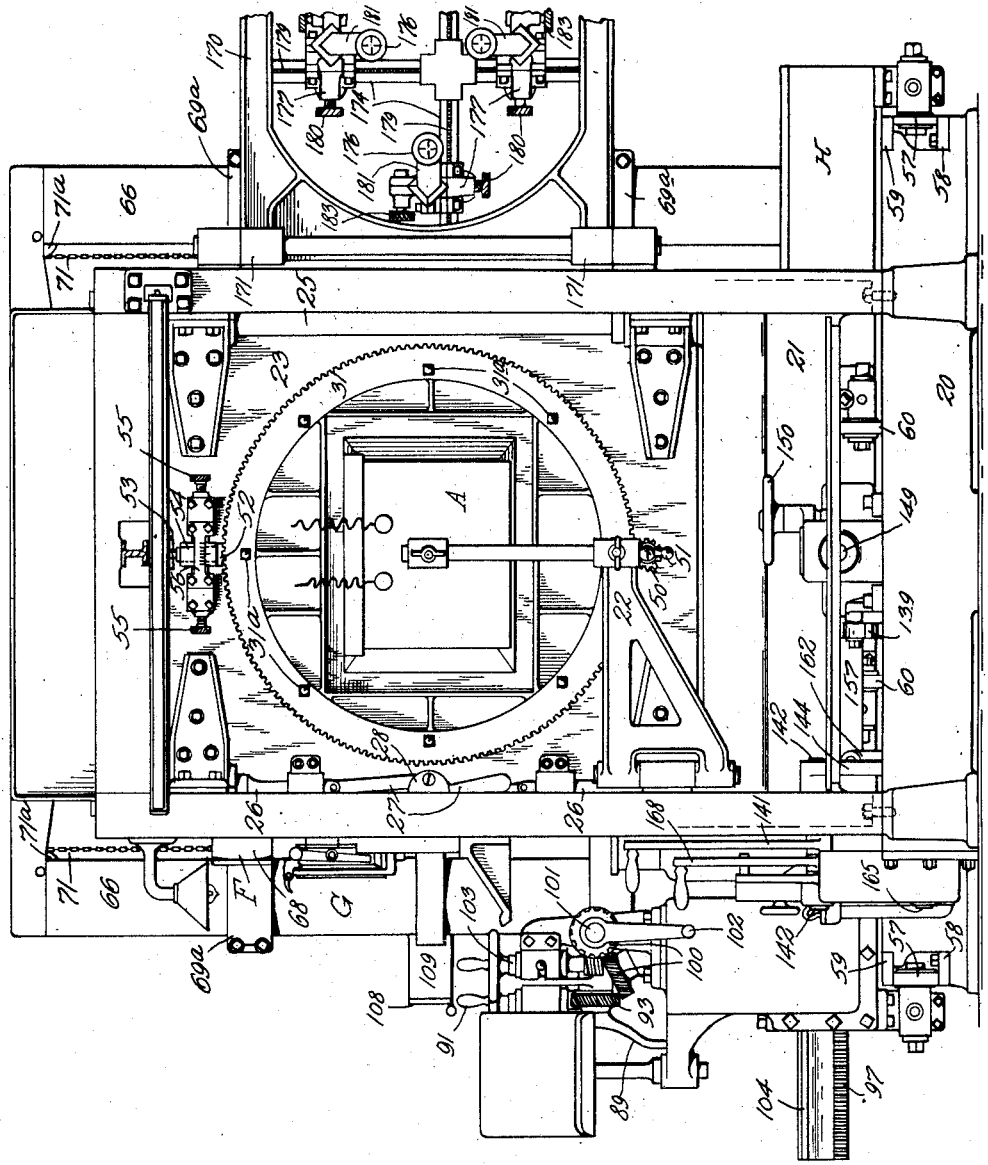
Fig. 5 is an end elevation of the machine.

The index head is rotatably adjusted on the swinging head so that the printing plate can be placed to make prints in any desired angular position on the sensitized plate. For this purpose a pinion 50 is shown, which is journaled on the swinging head and meshes with the gear ring 31, see Figs. 3 and 5. This pinion is turned by a suitable handle 51. The index head is locked in the position to which it is turned by a dog 52, Fig. 5, provided with teeth adapted to engage the teeth of the gear ring. This dog is moved into and out of engagement with the gear ring by means such as an operating screw 53, and in order to enable a very fine accurate adjustment of the index head, this locking dog is preferably mounted on a slide 54 which is adapted to be adjusted on the swinging head tangentially relative to the gear ring by adjusting screws 55. The gear ring preferably has 360 teeth so that the movement of the index head a distance equal to the width of one tooth produces a one degree movement of the index head. The index head can be adjusted to any desired fractional portion of a degree movement by the tangential adjustment of the locking dog. This fractional adjustment of the index head is indicated by suitable register marks or graduations on the adjustable slide for the locking dog and on the guide bracket 56 in which the slide moves. The teeth of the gear ring 31 are preferably numbered to show the full degree adjustments of the index head.

The sensitized press plate D is supported in a plane parallel with the face of the printing plate C in a plate holder E which is mounted on a carrying frame F arranged to move vertically parallel with the plane of the sensitized plate. This carrying frame is mounted on a second frame or auxiliary carriage G which, in turn, is adjustable horizontally parallel with the plane of the sensitized plate on a main carriage H which is movable on the base 20 of the machine toward and from the support for the printing plate. This main carriage H shown extends horizontally transversely of the machine over the stationary base 20 and is provided at each of its opposite ends with a pair of supporting rollers 57 arranged to roll on longitudinal rails 58 on the base 20 at opposite sides thereof. 59 represents rails secured on the base 20 and overhanging the rollers 57 to prevent the tilting or lifting of the carriage off of the supporting rails. The carriage H is also preferably provided between its ends with front and rear pairs of rollers 60 adapted to roll on tracks 60$^a$ on top of the base 20 for preventing the sagging or deflection of the middle portion of the carriage. These several rollers are preferably mounted on eccentrically adjustable journals which permit the rollers to be adjusted for leveling up the carriage so as to insure of its always remaining and moving in the same horizontal plane. The carriage is caused to travel accurately in a straight line by a guide bar 61, Fig. 6 on the carriage extending between a fixed face 62 and an adjustable gib or bar 62$^a$ on the carriage.

The auxiliary carriage G is provided with supporting rollers 63 arranged to roll on transverse rails 63$^a$ on the main carriage and the main carriage is provided with rails 64 which overhang the rollers 63 to prevent the lifting or tilting of the auxiliary carriage. These rollers, like those of the main carriage, are mounted on eccentrically adjustable journals. 65, Fig. 3 represents a rib on the main carriage coöperating with a fixed rib 65$^a$ and an adjustable gib or bar 65$^b$ on the auxiliary carriage for accurately guiding the latter carriage. The auxiliary carriage G is provided at its opposite ends with parallel upright posts 66 which are preferably tubular and are rigidly connected at their tops by a cross head 67. The vertically adjustable carrying frame F consists of horizontal top and bottom bars 68 rigidly connected by vertical end bars 69. This frame is slidably mounted by bearings 69$^a$ on the tubular upright posts 66 of the auxiliary carriage and is preferably counterbalanced by weights 70 which are arranged to move up and down in the hollow posts and are connected to the carrying frame F by chains 71 passing over pulleys 71ª journaled on the upper ends of the posts 66. These weights counterbalance the weight of the carrying frame and the plate holder carried thereby so as to permit the vertical adjustment of the frame with the minimum effort. The carrying frame is supported and adjusted vertically by two upright screw shafts 72 which are suitably journaled on the auxiliary carriage G and have screw-threaded engagements with nuts or sleeves 73 secured on the carrying frame. These screw shafts are connected at their lower ends by spiral gears 74, 75, to an adjusting shaft 76 which is journaled on and extends horizontally transversely of the machine on the auxiliary carriage G.

The sensitized plate holder E consists of a rectangular skeleton frame provided with opposite clamping jaws or holding means 77, 78, for two opposite edges of the sensitized plate. The clamp 78 shown for the lower edge of the plate is arranged on a bar 79 which is movable on the plate holder toward and from the upper clamp to suit plates of different widths and to stretch the sensitized plate and hold it taut and smooth. The adjustable clamp bar 79 slides on the end bars of the plate holder and is moved by screws 80 at the opposite ends of the sensitized plate holder. The sensitized plate is preferably provided centrally at its upper and lower margins with register marks, see Fig. 6, adapted to be placed in register with marks on the clamps for accurately placing the sensitized plate in the plate holder. Preferably, the sensitized plate holder is removably secured on the carrying frame F as follows: The upper bar of the plate holder is rabbeted and rests on a horizontal ledge 81 on the upper bar of the carrying frame. The plate holder hangs from this ledge with its lower end bearing against the front face of the carrying frame. The carrying frame is provided at its upper portion near one end with a stop 82, Fig. 6, against which the plate holder is forced and firmly held by an eccentric or cam lever 83 on the carrying frame at the opposite end of the plate holder. The plate holder is pressed and held firmly against the face of the carrying frame by levers or latches 84 on the carrying frame at the four corners of the plate holder. The latches have inclined faces which act against outwardly facing portions on the plate holder to wedge the plate holder inwardly against the face of the carrying frame. By use of the removable plate holder the sensitized plates can be properly adjusted and stretched on the holders before the latter are placed in the machine and the holders can be quickly and easily secured in the machine in exactly the intended position and readily removed. The removable holders also serve as desirable means for holding and handling the plates when applying the sensitive coatings and finishing the plates after exposure. As shown in Figs. 1 and 4, the plate holder F is so constructed that the plate is held thereby in a plane located outwardly beyond the plate clamps and all other parts of the plate holder and carrying frame. This enables the sensitized plate to bear flat against the surface of the printing plate and insures the proper contact between the plates without interference by any part of the supports for the two plates even in an adjustment in which the printing plate extends beyond the edge of the sensitized plate, as shown in Figs. 4 and 18 in order to make prints from a small subject on the printing plate close to the edge of the sensitized plate.

Any suitable means may be employed for adjusting the carrying frame F and auxiliary carriage G respectively, vertically and horizontally for placing any desired portion of the sensitized plate D opposite the printing plate. For adjusting the carrying frame, the shaft 76 is shown as being connected by bevel pinions 85 to an upright shaft 86, Fig. 14, journaled on the auxiliary carriage. This shaft is connected by beveled gears 87 to an operating shaft 88 which can be turned by a crank 89 applied to its outer end or by other suitable means. The carrying frame can be removed quickly to an approximate position by turning this crank. In order to facilitate a fine, accurate adjustment of the carrying frame, a fine adjusting shaft 90 turned by a handle or wheel 91 is provided. A worm 92 on this shaft is adapted to mesh with a spiral gear 93 on the coarse adjusting shaft 88. The fine adjusting shaft 90 is journaled eccentrically in a bushing 94 which is adapted to be turned by a handle 95 in a bearing 96 on the auxiliary carriage for throwing the fine adjusting worm into and out of mesh with the coarse adjusting shaft. After the carrying frame has been adjusted coarsely to an approximate position by turning the handle 89, the fine adjusting worm is placed in connection with the coarse adjusting shaft and turned to give the desired accurate adjustment of the carrying frame.

The adjusting means shown for the auxiliary carriage G comprise a toothed rack 97 on one side of the carriage which meshes with a spiral gear 98 on an inclined shaft 99 suitably journaled on the main carriage H. This inclined shaft is connected by spiral gears 100 to a coarse adjusting shaft 101 which is provided at its outer end with a crank or handle 102 for turning it. 103 is a fine adjusting shaft for the auxiliary carriage. This shaft is provided with a worm adapted to be thrown into and out of mesh with a gear on the coarse adjusting shaft in the manner above explained in connection with the fine adjusting shaft for the carrying frame.

The adjusment of the auxiliary carriage is preferably shown by a suitable graduated scale 104, Fig. 1, fixed directly on the auxiliary carriage. This scale in the movement of the carriage moves beneath a microscope 105 which is fixed on the main carriage above the scale 104. This microscope projects an enlarged image of the underlying graduations of the scale 104 on to a ground glass or screen 106, Fig. 2, disposed above the microscope. 107, Fig. 1 indicates a small electric lamp for illuminating the scale 104 which is preferably made of glass or other suitable transparent material. By the use of the microscope arranged in this way the scale 104 can be graduated into extremely fine fractions of an inch or unit of measure and the enlarged image of these fine graduations can be readily seen and read on the screen without requiring the operator to place his eye close to the microscope as would have to be done in the case of the use of an ordinary microscope. The screen 106 furthermore is also preferably provided with a fixed graduated scale which enables a still finer subdivision of the fine divisions of the scale 104. Since the scale 104 is fixed to and moves with the auxiliary carriage and is read by the microscope and screen which are mounted on a relatively fixed part, there is no possibility of error due to lost motion between the moving and the designating part of the indicating device and it is therefore possible to readily adjust the auxiliary carriage accurately to positions measured in thousandths of an inch or less.

The adjustment of the carrying frame F is indicated in a similar manner by a scale 108, Fig. 1, secured directly on the carrying frame and adapted to be read by the microscopic projection device 109, similar to that above explained.

The pressure device I for pressing the sensitized plate into close contact with the printing plate comprises a pressure block 111 faced with suitable yielding material which is adapted to engage the rear face of the sensitized plate and is removably and adjustably secured on a head 112 which is radially adjustable on a head 113, which in turn is rotatably adjustable on a carriage K. As shown, in Fig. 3, the pressure block has a hollow shank 114 which fits on a central stud 115 on the head 112 within a split clamp 116 which is adapted to be contracted around the shank to rigidly secure the pressure block to the radially adjustable head. The clamp 116 is splined on the stud 115 and has a swivel screw-threaded sleeve 117 which engages a screw thread on the radial head so that by turning this sleeve the pressure block can be adjusted on the head 112, without turning the block, nearer to or farther from the printing plate B. The coupling sleeve is preferably split and provided with a screw 118 for contracting it to grip the radially adjustable head to hold the pressure block securely in the adjusted position. The head 112 is mounted to slide radially in a diametrical guide groove in the rotatable head 113 and is adjusted radially by a screw 119 journaled on the rotary head. The rotary head has a cylindrical shank 120 adapted to turn in a bearing 121 in the supporting carriage K. 122 is a screw passing through a clamping plate 123 at the end of the bearing and into a threaded hole in the end of the shank of the rotary head. The rotary head can be turned to the desired position and there secured by means of this clamp screw. The clamping plate 123 is caused to turn with this shank 120 as by a pin 124 and its edge is graduated to indicate the rotary adjustment of the pressure block. This construction enables the pressure block to be turned angularly and moved radially to place it directly opposite and in corresponding angular position to the printing plate, or in different relations to the printing plate, either concentrically or eccentrically thereto irrespective of the adjustment of the latter. The pressure block can also be adjusted on the radial head toward and from the printing plate as may be necessary, by reason of variations in thickness of different printing plates so as to obtain the required pressure on the sensitized plate with a given movement of the pressure carriage K toward the printing plate. One pressure block can also be detached and replaced by another block of different size suitable for the particular printing plate being used in the machine. It is desirable to use different pressure blocks corresponding in size with the different sized printing plates employed because a pressure block larger than the printing plate is apt to crease the sensitized plate by pressing it over the edges of the printing plate. In cases where it is necessary to make prints from a small subject on the printing plate close to the edge or corner of the sensitized plate, the printing plate may have to project beyond the edges of the sensitized plate and of the pressure block which enters the holder frame E to engage the sensitized plate, as shown in Figs. 17 and 18. In such cases a small supplemental pressure block 125, shown in Fig. 18 removably supported on the face of the main pressure block 111 is preferably employed. As shown, the supplemental block 125 is retained in place on the block 111 by a looped strap 126 passing around retaining bars 128 removably seated in notches or seats 129 on the upper and lower edges of the pressure block 111. The strap 126 has an elastic section 130 which holds the strap taut and holds the retaining bars in their seats. The strap permits the supplemental block to be shifted vertically and laterally to any position on the main pressure block required to place it directly opposite the subject on the printing plate and confine the pressure within the area of the printing plate. Therefore, there can be no danger of creasing or disarranging the sensitized plate.

The pressure carriage K, as shown, is movable toward and from the printing plate support on an upward enlargement or extension 131 of the main carriage H. The pressure carriage is provided at opposite sides with supporting rollers 132 arranged to travel on rails 132ᵃ at opposite sides of the extension 131 of the main carriage and the main carriage is provided with rails 133 which overhang the rollers to prevent the lifting or tipping of the pressure carriage on the main carriage. The pressure carriage, like the main and auxiliary carriages, is preferably provided with a guide rib and adjustable gib arranged to slide in engagement with a straight guide rail on the main carriage for accurately guiding the pressure carriage.

The main carriage H and the pressure carriage K are moved for placing the sensitized plate against the printing plate and pressing it into firm contact therewith, as follows:—

135, Fig. 3 represents a gear wheel which is suitably journaled in the upright extension of the main carriage H and meshes with a toothed rack 136 on the bottom of the pressure carriage K and with a toothed rack 137 on a movable bar 138 arranged to slide lengthwise on the base 20 of the machine. A toothed rack bar 139, Figs. 8 and 11, is secured to the main carriage and extends therefrom into the housing 21 and meshes with a pinion 140 which is operatively connected to and adapted to be turned by a main controlling lever 141, Fig. 1. As shown, this lever is secured on a shaft 142, Fig. 11 and is connected to the shaft 143 of the pinion 140 by a gear sector 144 and a pinion 145, so that when the lever is thrown to the left in Fig. 1, the pinion 140 will be rotated and will move the rack and main carriage toward the printing plate holder. The main carriage is moved toward the printing plate support by the lever 141 until arrested by the engagement of a stop projection or part 145 on the main carriage with an adjustable limit stop 146, Figs. 8—13. This limit stop is slidably mounted in a stop carriage 147 which is slidably mounted in a guide 148 on the base of the machine to move in the direction of movement of the main carriage H toward and from the plane of the printing plate. The limit stop 146 is adjusted on its carriage toward and from the plane of the printing plate, preferably by a screw 149 which is rotatably mounted on the stop carriage and has a threaded engagement with the limit stop. This screw is turned by a wheel 150 connected by spiral gears 151 to the screw. A mark on the reduced upper end of the limit stop which moves in a slot in the top of the stop carriage coöperates with a scale 152 on the edge of the slot to indicate the adjustment of the stop. The head of the adjusting wheel 150 is also provided with degree graduations coöperating with an adjacent pointer 153 to show the degree of rotation of the wheel. The wheel can thus be turned a desired fraction of a revolution and effect a very fine, accurate adjustment of the limit stop 146. The stop carriage 147 is provided with a roller 154 which is arranged between two opposite cam wheels 155 secured on a shaft 156 which is suitably journaled and held from endwise movement in the base of the machine. One of the cam wheels is provided with a raised face portion and the other cam wheel has an oppositely disposed depression, see Fig. 9, between which the roller 154 is confined, so that the stop carriage with the limit stop will be moved a definite distance equal to the height of the raised part of the cam wheel in one direction or the other by a partial rotation of the cam wheels in one or the other direction. When the main carriage has been moved by the lever 141 to the position determined by the adjustment of the limit stop 146, a latch 157 automatically engages the stop projection 145 on the main carriage and locks the main carriage to the stop carriage 147 so that the main carriage will move with the stop carriage when the latter is moved by the cam wheels 155. The latch shown is slidably mounted in a transverse guide 158 on the limit stop block and has a bevel faced slot 159 adapted to be moved into and out of a locking notch 160, Fig. 13, in the stop projection, the latch having a beveled face which is engaged by the beveled end of the stop projection to retract the latch. When the slot in the stop projection is brought into register with the latch, the latter is projected by a spring 161 into the notch in the stop projection to lock the main carriage to the stop carriage. The latch is adapted to be retracted to release the main carriage from the stop carriage by a bell crank lever 162 having an arm projecting out of the base of the machine and adapted to be moved by the foot of the operator. The latch has a sliding connection with the foot lever 162 permitting the latch to slide with the stop carriage. The cam wheel shaft 156 is provided with a screw-threaded portion 163 which turns in a screw-threaded hole in the movable rack bar 138 so that when the shaft is turned for operating the stop carriage the rack bar will be moved in a direction opposite to the direction of movement of the main carriage. The cam wheel shaft 156 is connected as by bevel gear wheels 164, a shaft 165, a pinion 166 and a gear sector 167 to a second controlling lever 168.

When the lever 168 is thrown from the position shown in Fig. 1 to the left, after the main carriage H has been connected to the stop carriage 147, it will turn the cam shaft 156 and attached cam wheels a portion of a revolution, thereby moving the stop carriage and main carriage a predetermined distance sufficient to move the sensitized plate from a clearance position out of contact with the printing plate to a position in which the sensitized surface of the sensitized plate contacts with the face of the printing plate. The continued movement of the lever 168 then causes a further rotation of the cam shaft 156 and a further movement of the rack bar 138. When the main carriage is moved toward the printing plate by the actuation of the main controlling lever 141, the gear wheel will move with the carriage and roll on the rack bar, which is then held stationary by its connection with the cam shaft 156, and the gear wheel will thus cause a movement of the pressure carriage toward the printing plate support a distance twice as great as the movement of the sensitized plate with the main carriage. This moves the main carriage to the clearance position in which it is arrested by the limit stop, when the sensitized plate will occupy a position slightly out of contact with the printing plate and the pressure block will be close to but out of engagement with the rear face of the sensitized plate. Then when the second controlling lever 168 is actuated the sensitized plate will be moved a distance sufficient to place it lightly in contact with the face of the printing plate and at the same time the pressure block will be moved into contact with the rear face of the sensitized plate and bear lightly against the same. During the last portion of the throw of the second lever 168, after the movement of the limit stop is completed, the rotation of the cam shaft and movement of the rack bar 138 thereby will further turn the gear wheel 164 and move the pressure block to press the sensitized plate against the printing plate with the necessary pressure to insure the required intimate and uniform contact of the sensitized plate with the printing plate.

In order to accurately square up and center the printing plate in its holder with reference to the center of rotation of the index head, registering or centering means are provided which are preferably constructed as follows:—

170, Figs. 2, 19 and 21 represents an open centering frame which is hinged by arms 171 on one side of the housing 21 so that when the swinging head 23 carrying the printing plate is swung out to the position shown in Fig. 19, the centering frame 170 can be swung around in front of the printing plate holder, as shown in Figs. 19 and 21. A stop 172 is shown in Fig. 19 against which the swinging head bears when centering the printing plate, and the centering frame is provided with a latch or bolt 173 of any suitable sort adapted to engage the swinging head to lock the centering frame in centering position. When the printing plate is in position for printing the centering frame is swung back out of the way of the lamp, as indicated in Figs. 2 and 5. The centering frame is provided with two stationary guide bars or rails 174 which extend across the same at right angles to each other, parallel with the printing plate when the centering frame is in centering position. Slidably mounted on the guide bars are indicating members or devices each of which preferably consists of a small transparent or glass plate 175 mounted in a supporting ring or tube 176 and provided with fine cross marks which are adapted to register with register marks on the face of the printing plate. Each indicating device is carried by a carriage or slide 177 arranged to slide lengthwise on one of the guide bars 174, the indicating devices being so disposed that when the carriages 177 are slid along the guide bars the intersections of the cross marks of the indicating devices will move in paths at right angles to each other extending diametrically with respect to the printing plate holder and the rotary index head. The indicator slide or carriage is preferably moved along the guide bar by a pinion 178 meshing with a toothed rack 179, Figs. 5 and 22, on the guide bar. The pinion is secured to a shaft 179$^a$ which is journaled in the indicator carriage and is turned by a finger wheel 180 at its outer end. By turning this wheel the carriage can be moved along the guide bar to any desired position. The ring or tube carrying the indicator glass 175 is preferably secured to an arm or bracket 181 adapted to slide toward and from the printing plate or perpendicularly to the plane of movement of the indicator carriage in a guide 182 on the indicator carriage. The indicating device is adjusted toward and from the face of the printing plate, preferably by a finger wheel 183 secured to a shaft which is journaled in the indicator carriage and provided with a pinion 184 which meshes with a toothed rack 185 on the supporting bracket for the indicating device. The indicating device can be adjusted parallel with the face of the printing plate to a position approximately over the register marks on the printing plate and then moved into close proximity to the face of the printing plate. The printing plate can then be adjusted in its holder C by suitable manipulation of the securing jaws 38 until the register marks on the marginal portions of the printing plate beneath the indicating devices register exactly with the cross marks on the indicating devices. When such registration is secured the printing plate will be squared up and centered with relation to the center of rotation of the printing plate holder and index head. Since the glass indicator plates can be adjusted into close proximity to or in contact with the face of the printing plate, a very exact centering of the printing plate is made possible by the described registering and centering device, and this is necessary since if the printing plate is not accurately centered with reference to the center of rotation of the index head, the error is increased when the index head is rotated on the swinging head to give a desired angular position of the printing plate in the machine. The described registering and centering device not only enables different printing plates to be similarly positioned in the index head, but insures that each plate will be accurately squared up in the printing plate holder and centered with reference to the center of rotation of the holder and index head.

In the use of the apparatus, after the sensitized and printing plates have been properly adjusted and secured in place in the apparatus, the lever 141 is actuated. This causes the main carriage H and pressure device I to be moved toward the printing plate until arrested by connection with the limit stop 146 with the sensitized plate in the clearance position a short distance away from the printing plate in the manner before explained. The sensitized plate can then be moved from this clearance position into contact with the printing plate and the pressure applied, and the sensitized plate returned to the clearance position by the simple actuation of the other lever 168. The adjustment of the carrying frame F and auxiliary carriage G for repeating prints on the same sensitized plate is made when the parts are in the clearance position, and it is only necessary to fully retract the carriage H and pressure device I to the positions shown in Fig. 1 when it is desired to remove or replace the sensitized plate or give access to the same for other reasons. Since the sensitized plate support is moved only a short fixed distance, (about one-fourth of an inch is sufficient) to and from the clearance position by like throws of the lever 168, the apparatus can be operated very rapidly and with little effort to make repeat prints and to print from different printing plates on the same sensitized plate. Different printing plates are rarely of the same thickness, and when changing printing plates, the limit stop 146 can be adjusted by turning the wheel 150 so that the clearance position of the sensitized plate will always be the same distance from the face of the printing plate regardless of variations in thickness of different printing plates. Therefore, the actuation of the lever 168 and the pressure applied on the sensitized plate will always be the same, notwithstanding variations in the printing plates. This also insures always the stopping of the sensitized plate exactly in a position in which it contacts lightly with the face of the printing plate and prevents the possibility of creasing or disarranging the sensitized plate which would result from an under or over movement of the sensitized plate. Extremely exact registration and accurate work are thus possible with a rapid operation of the apparatus. The importance of this is realized when it is understood that misregister of a thousandth of an inch, especially in color printing is often sufficient to spoil a job.

Ordinarily the sensitized plates employed in the apparatus are sheet metal plates adapted, after finishing, to be used in mechanical printing presses. In some classes of work, however, it is desirable to use a glass sensitized or print-receiving plate. This is done for instance to make a group of small subjects on a negative which is afterward used as a printing plate in the manner before discribed, for repeating this group on a sensitized metal press plate. Fig. 20 shows a holder 186 adapted to be used in the apparatus in place of the holder E for holding a glass sensitized plate D'. This holder, which is substantially similar in all respects to the printing plate holder C before described, is mounted on a baseboard or plate 187 to the opposite edges of which are suitably fastened two thin, flexible, metal plates 188. The free edges of these flexible metal plates are secured by suitable clamps in a frame or holder 190 which may be the sensitized plate holder E before described or a similar frame adapted to be secured in the apparatus in the same manner. The flexible metal plates 188 provide a yielding or flexible support for the sensitized glass plate adapting it to adjust itself to and bear flat against the face of the printing plate and thus preventing the breaking of the glass plates when the opposite faces thereof are not parallel or the plates are not of uniform thickness throughout.

I claim as my invention.

1. In a photographic printing apparatus, the combination of a support for a sensitized plate, a support for a photographic printing plate, a carriage on which said first support is movable relative to said other support to locate different portions of the sensitized plate opposite the printing plate, said carriage being movable toward and from the printing plate support to place the sensitized and printing plates into and out of contact, a pressure device for pressing the sensitized and printing plates into close contact, means independent of the pressure device for moving said carriage to place the sensitized plate in contact with the printing plate, and means for illuminating the printing plate.

2. In a photographic printing apparatus, the combination of a support for a sensitized plate, a support for a photographic printing plate, a carriage on which said first support is movable relative to said other support to locate different portions of the sensitized plate opposite the printing plate, said carriage being movable toward and from the printing plate support to place the sensitized and printing plate into and out of contact, a pressure device, means for moving the pressure device to press the sensitized and printing plates into close contact, means for moving said carriage for placing the sensitized plate in contact with the printing plate, and means for illuminating the printing plate.

3. In a photographic printing apparatus, the combination of a support for a sensitized plate, a support for a photographic printing plate, a carriage on which said first support is movable in two directions parallel with the plane of the sensitized plate to locate different portions of the sensitized plate opposite the printing plate, said carriage being movable toward and from the printing plate support to place the sensitized and printing plates into and out of contact, means for pressing the sensitized and printing plates into close contact, means for moving said carriage toward the printing plate support for placing the sensitized plate in contact with the printing plate, and means for illuminating the printing plate.

4. In a photographic printing apparatus, the combination of a support for a sensitized plate, a support for a photographic printing plate, an auxiliary carriage supporting said first support, a main carriage supporting said auxiliary carriage, said support and auxiliary carriage being movable in different directions parallel with the plane of the sensitized plate to locate different portions of the sensitized plate opposite the printing plate, said main carriage being movable toward and from the printing plate support to place the sensitized and printing plates into and out of contact, means for pressing the sensitized and printing plates into close contact, means for moving said main carriage toward the printing plate support for placing the sensitized plate in contact with the printing plate, and means for illuminating the printing plate.

5. In a photographic printing apparatus, the combination of a support for a sensitized plate, a support for a photographic printing plate, a carriage on which said first support is movable relative to said other support to locate different portions of the sensitized plate opposite the printing plate, said carriage being movable toward and from the printing plate support to place the sensitized and printing plates into and out of contact, a pressure device mounted on said carriage and movable relative thereto for pressing the sensitized and printing plates into close contact, means for moving said carriage for placing the sensitized plate in contact with the printing plate, and means for illuminating the printing plate.

6. In a photographic printing apparatus, the combination of a support for a sensitized plate, a support for a photographic printing plate, a carriage on which said first support is movable relative to said other support to locate different portions of the sensitized plate opposite the printing plate, said carriage being movable toward and from the printing plate support to place the sensitized and printing plates into and out of contact, a pressure device, means for moving said carriage to carry the sensitized plate and said pressure device toward the printing plate, means for operating the pressure device to apply the pressure, and means for illuminating the printing plate.

7. In a photographic printing apparatus, the combination of a support for a sensitized plate, a support for a photographic printing plate, a carriage on which said first support is movable relative to said other support to locate different portions of the sensitized plate opposite the printing plate, said carriage being movable toward and from the printing plate support to place the sensitized and printing plates into and out of contact, a pressure device, means for moving said carriage to carry the sensitized plate and said pressure device toward the printing plate, means for placing the sensitized plate in contact with the printing plate and for operating the pressure device to apply the pressure, and means for illuminating the printing plate.

8. In a photographic printing apparatus, the combination of a support for a sensitized plate, a support for a photographic printing plate, said first support being movable toward and from the second support, a stop for arresting the movement of said first support before the sensitized plate contacts with the printing plate, means for further moving said first support for placing the sensitized plate in contact with the printing plate, means for pressing the sensitized and printing plates into close contact, and means for illuminating the printing plate.

9. In a photographic printing apparatus, the combination of a support for a sensitized plate, a support for a photographic printing plate, said first support being movable toward and from the second support, an adjustable stop for arresting the movement of said first support with the sensitized plate a predetermined distance from the printing plate, means for further moving said first support for placing the sensitized plate in contact with the printing plate, means for pressing the sensitized and printing plates into close contact, and means for illuminating the printing plate.

10. In a photographic printing apparatus, the combination of a support for a sensitized plate, a support for a photographic printing plate, said first support being movable toward and from the second support, a stop for arresting the movement of said first support before the sensitive plate contacts with the printing plate, means for moving said first support with said stop for placing the sensitive plate in contact with the printing plate, means for pressing the sensitized and printing plates into close contact, and means for illuminating the printing plate.

11. In a photographic printing apparatus, the combination of a support for a sensitized plate, a support for a photographic printing plate, said first support being movable toward and from the second support, a stop for arresting the movement of said first support before the sensitized plate contacts with the printing plate, means for connecting said stop to said first support, means for moving said stop to further move said first support and place the sensitized plate in contact with the printing plate, means for pressing the sensitized and printing plates into close contact, and means for illuminating the printing plate.

12. In a photographic printing apparatus, the combination of a support for a sensitized plate, a support for a photographic printing plate, said first support being movable toward and from the second support, a pressure device also movable toward said second support for pressing the sensitized and printing plates into close contact, a stop for arresting the movement of said first support and said pressure device before the sensitized plate contacts with the printing plate, means for further moving said first support for placing the sensitized plate in contact with the printing plate, and means for illuminating the printing plate.

13. In a photographic printing apparatus, the combination of a support for a sensitized plate, a support for a photographic printing plate, said first support being movable toward and from the second support, a pressure device also movable toward said second support for pressing the sensitized and printing plates into close contact, a stop for arresting the movement of said first support and said pressure device before the sensitized plate contacts with the printing plate, means for further moving said printing support for placing the sensitized plate in contact with the printing plate, and for operating said pressure device to apply the pressure, and means for illuminating the printing plate.

14. In a photographic printing apparatus, the combination of a support for a sensitized plate, a support for a photographic printing plate, said first support being movable toward and from the second support, a pressure device also movable toward said second support for pressing the sensitized and printing plates into close contact, an adjustable stop for arresting the movement of said first support and said pressure device with the sensitized plate a predetermined distance from the printing plate, means for further moving said first support for placing the sensitized plate in contact with the printing plate, and means for illuminating the printing plate.

15. In a photographic printing apparatus, the combination of a support for a sensitized plate, a support for a photographic printing plate, said first support being movable toward and from the second support, a pressure device also movable toward said second support for pressing the sensitized and printing plates into close contact, a stop for arresting the movement of said first support and pressure device before the sensitized plate contacts with the printing plate, means for connecting said stop to said first support and pressure device, means for moving said stop to further move said first support and said pressure device and place the sensitized plate in contact with the printing plate, means for operating the pressure device to apply the pressure, and means for illuminating the printing plate.

16. In a photographic printing apparatus, the combination of a support for a sensitized plate, a support for a photographic printing plate, said first support being movable toward and from the second support, a stop for arresting the movement of said first support in a clearance position with the sensitized plate out of contact with the printing plate, an operating device and connections for moving said first support to said clearance position, a second operating device and connections for moving said first support from said clearance position to place the sensitized plate in contact with the printing plate, means for pressing the sensitized and printing plates into close contact, and means for illuminating the printing plate.

17. In a photographic printing apparatus, the combination of a support for a sensitized plate, a support for a photographic printing plate, said first support being movable toward and from the second support, a stop for arresting the movement of said first support in a clearance position with the sensitized plate out of contact with the printing plate, an operating device and connections for moving said first support to said clearance position, a second operating device and connections for moving said first support from said clearance position to place the sensitized plate in contact with the printing plate, means actuated by said second operating device for pressing the sensitized and printing plates into close contact, and means for illuminating the printing plate.

18. In a photographic printing apparatus, the combination of a support for a sensitized plate, a support for a photographic printing plate, said first support being movable toward and from the second support, a stop for arresting the movement of said first support in a clearance position with the sensitized plate out of contact with the printing plate, an operating device and connections for moving said first support to said clearance position, a second operating device and connections for moving said first support from said clearance position to place the sensitized plate in contact with the printing plate, means for pressing the sensitized and printing plates into close contact, connections by which said second operating device actuates said pressure means to apply the pressure after the contact of the sensitized and printing plates, and means for illuminating the printing plate.

19. In a photographic printing apparatus, the combination of a support for a sensitized plate, a support for a photographic printing plate, one of said supports being movable relative to the other for placing different portions of one plate opposite the other plate, means for securing each plate on its support, the support and securing means for each plate being located back from the plane of the outer surface of said plate whereby said sensitized and printing plates can bear flat against each other irrespective of whether either plate extends beyond the edge of the other plate, means for pressing said plates into close contact, and means for illuminating the printing plate.

20. In a photographic printing apparatus, the combination of a holder for a sensitized plate provided with means for securing and stretching the plate thereon, a holder for a photographic printing plate provided with means for securing the plate thereon, a support for each of said holders, one of said holders being movable relative to the other for placing different portions of one plate opposite the other plate, and one of said holders being movable for placing the plates into and out of contact, the parts of the support, holder and securing means for each plate being located back from the plane of the outer surface of said plate whereby said sensitized and printing plates can bear flat against each other irrespective of whether either plate extends beyond the edge of the other plate and opposite parts of the holder or support therefor, means for pressing said plates into close contact, and means for illuminating the printing plate.

21. In a photographic printing apparatus, the combination of a support for a sensitized plate, a support for a photographic printing plate, said first support being movable relative to said second support for placing different portions of the sensitized plate opposite the printing plate and being movable for placing the sensitized plate into and out of contact with the printing plate, and said second support being mounted to swing away from a normal operative position opposite said first support to afford access to said printing plate, means for pressing said sensitized and printing plates into close contact and means for illuminating said printing plate.

22. In a photographic printing apparatus, the combination of a support for a sensitized plate, a support for a photographic printing plate, said first support being movable relative to said second support for placing different portions of the sensitized plate opposite the printing plate and being movable for placing the sensitized plate into and out of contact with the printing plate, and said second support being mounted to swing away from a normal operative position opposite said first support to afford access to said printing plate, a holder on which said printing plate is secured and which is rotatably adjustable on said second support for placing the printing plate in different angular positions, means for pressing said sensitized and printing plates into close contact, and means for illuminating said printing plate.

23. In a photographic printing apparatus, the combination of a support for a sensitized plate, a support for a photographic printing plate, said first support being movable relative to said second support for placing different portions of the sensitized plate opposite the printing plate and being movable for placing the sensitized plate into and out of contact with the printing plate, and said second support being mounted to swing away from a normal operative position opposite said first support to afford access to said printing plate, a holder for the printing plate provided with adjustable means for securing and centering the printing plate on said holder, and a head on which said holder is secured and which is rotatably adjustable on said second support for placing the printing plate in different angular positions, means for pressing said sensitized and printing plates into close contact, and means for illuminating said printing plate.

24. In a photographic printing apparatus, the combination of a support for a sensitized plate, a support for a photographic printing plate, one of said supports being movable relative to the other for placing different portions of the sensitized plate opposite the printing plate, and one of said supports being movable for placing the sensitized plate into and out of contact with the printing plate, a holder for the printing plate provided with adjustable means for securing and centering the printing plate on said holder, a head on which said holder is secured and which is rotatably adjustable on said second support for placing the printing plate in different angular positions, means for pressing said sensitized and printing plates into close contact, and means for illuminating said printing plate.

25. In a photographic printing apparatus, the combination of a support for a sensitized plate, a support for a photographic printing plate, one of said supports being movable relative to the other for placing different portions of the sensitized plate opposite the printing plate, and one of said supports being movable for placing the sensitized plate into and out of contact with the printing plate, a holder for the printing plate provided with adjustable means for securing and centering the printing plate on said holder, a head which is rotatably adjustable on said second support, means for securing said holder on said head with the center of the printing plate coincident with the center of rotation of said head, means for pressing said sensitized and printing plates into close contact, and means for illuminating said printing plate.

26. In a photographic printing apparatus, the combination of a support for a sensitized plate, a support for a photographic printing plate, one of said supports being movable relative to the other for placing different portions of the sensitized plate opposite the printing plate, and one of said supports being movable for placing the sensitized plate into and out of contact with the printing plate, a head which is rotatably adjustable on said second support, a removable holder carrying the printing plate and provided with adjustable means for securing and centering the printing plate on said holder, means for removably securing said holder on said head with the center of the printing plate coincident with the center of rotation of said head, means for pressing said sensitized and printing plates into close contact, and means for illuminating said printing plate.

27. In a photographic printing apparatus, the combination of a support for a sensitized plate, a support for a photographic printing plate, one of said supports being movable relative to the other for placing different portions of the sensitized plate opposite the printing plate, and one of said supports being movable for placing the sensitized plate into and out of contact with the printing plate, and means for pressing the sensitized and printing plates into close contact comprising a pressure block, two rotatably adjustable connections for said pressure block, and means for relatively adjusting said connections to rotate about concentric or eccentric axes.

28. In a photographic printing apparatus, the combination of a support for a sensitized plate, a support for a photographic printing plate, and one of said supports being movable relative to the other for placing different portions of the sensitized plate opposite the printing plate, and one of said supports being movable for placing the sensitized plate into and out of contact with the printing plate, and means for pressing the sensitized and printing plates into close contact comprising a pressure block, a head on which said pressure block is rotatably adjustable, and a rotatably adjustable head on which said first head is adjustable to locate the center of rotation of said pressure block concentric or eccentric to the axis of said rotatably adjustable head.

29. In a photographic printing apparatus, the combination of a support for a sensitized plate, a support for a photographic printing plate, and one of said supports being movable relative to the other for placing different portions of the sensitized plate opposite the printing plate, and one of said supports being movable for placing the sensitized plate into and out of contact with the printing plate, and means for pressing the sensitized and printing plates into close contact comprising a pressure block, a rotatably adjustable head, and a head which is adjustable radially on said rotatably adjustable head, and on which said pressure block is rotatably adjustable.

30. In a photographic printing apparatus, the combination of a support for a sensitized plate, a support for a photographic printing plate, one of said supports being movable relative to the other for placing different portions of the sensitized plate opposite the printing plate, and one of said supports being movable for placing the sensitized plate into and out of contact with the printing plate, and means for pressing the sensitized and printing plates into close contact comprising a pressure block, and two rotatably adjustable connections for said pressure block, and means for relatively adjusting said connections to rotate about concentric or eccentric axes, said pressure block being also adjustable axially of one of said connections.

31. In a photographic printing apparatus, the combination of a support for a sensitized plate, a support for a photographic printing plate, one of said supports being movable relative to the other for placing different portions of the sensitized plate opposite the printing plate, and one of said supports being movable for placing the sensitized plate into and out of contact with the printing plate, and means for pressing the sensitized and printing plates into close contact, comprising a main pressure block, and a supplemental pressure block removably and adjustably supported on the face of said main pressure block.

32. In a photographic printing apparatus, the combination of a support for a sensitized plate, a support for a photographic printing plate, one of said supports being movable for placing the sensitized plate into and out of contact with the printing plate, and means for pressing the sensitized and printing plates into close contact, comprising a main pressure block which is adjustable to different positions parallel with the printing plate, and a supplemental pressure block removably and adjustably supported on the face of said main pressure block.

33. In a photographic printing apparatus, the combination of a support for a sensitized plate, a support for a photographic printing plate, one of said supports being movable relative to the other for placing different portions of the sensitized plate opposite the printing plate, and one of said supports being movable for placing the sensitized plate into and out of contact with the printing plate, and means for pressing the sensitized and printing plates into close contact, comprising a main pressure block which is adjustable to different positions parallel with the printing plate, and a supplemental pressure block removably and adjustably supported on the face of said main pressure block.

34. In a photographic printing apparatus, the combination of a support for a sensitized plate, a support for a photographic printing plate, one of said supports being adjustable relative to the other for placing the printing plate in different printing relations to the sensitized plate, means for causing close contact of the printing plate with the sensitized plate, means for adjustably securing the printing plate on its support, centering means mounted in said apparatus in definite relation to said printing plate support and coöperating with said printing plate for accurately centering the printing plate on its support, and means for illuminating the printing plate.

35. In a photographic printing apparatus, the combination of a support for a sensitized plate, a support for a photographic printing plate, one of said supports being adjustable relative to the other for placing the printing plate in different printing relations to the sensitized plate, means for causing close contact of the printing plate with the sensitized plate, means for adjustably securing the printing plate on its support, centering means mounted in said apparatus and arranged to overlie the printing plate in predetermined relation to said printing plate support and coöperating with the printing plate for accurately centering the printing plate on its support, and means for illuminating the printing plate.

36. In a photographic printing apparatus, the combination of a support for a sensitized plate, a support for a photographic printing plate, one of said supports being adjustable relative to the other for placing the printing plate in different printing relations to the sensitized plate, means for causing close contact of the printing plate with the sensitized plate, means for adjustably securing the printing plate on its support, registering means mounted in said apparatus and arranged to overlie the printing plate, and having an indicating member adjustable in a fixed path over the face of the printing plate and adapted to coöperate with register marks on the printing plate for accurately positioning the printing plate on its support, and means for illuminating the printing plate.

37. In a photographic printing apparatus, the combination of a support for a sensitized plate, a support for a photographic printing plate, one of said supports being adjustable relative to the other for placing the printing plate in different printing relations to the sensitized plate, means for causing close contact of the printing plate with the sensitized plate, means for adjustably securing the printing plate on its support, registering means mounted in said apparatus, and arranged to overlie the printing plate, and having indicating members adjustable in different fixed paths over the face of the printing plate and adapted to coöperate with register marks on the printing plate for accurately positioning the printing plate on its support, and means for illuminating the printing plate.

38. In a photographic printing apparatus, the combination of a support for a sensitized plate, a support for a photographic printing plate, one of said supports being adjustable relative to the other for placing the printing plate in different printing relations to the sensitized plate, means for causing close contact of the printing plate with the sensitized plate, means for adjustably securing the printing plate on its support, registering means mounted in said apparatus and arranged to overlie the printing plate, and having an indicating member adjustable in a fixed path over the face of the printing plate and adapted to coöperate with register marks on the printing plate for accurately positioning the printing plate on its support, and means for illuminating the printing plate, said indicating member being also adjustable toward the printing plate into close relation thereto.

39. In a photographic printing apparatus, the combination of a support for a sensitized plate, a support for a photographic printing plate, one of said supports being adjustable relative to the other for placing the printing plate in different printing relations to the sensitized plate, means for causing close contact of the printing plate with the sensitized plate, means for adjustably securing the printing plate on its support, registering means mounted in said apparatus and movable to overlie the printing plate, and having an indicating member adjustable in predetermined relation to said printing plate support and adapted to coöperate with said printing plate for accurately positioning the printing plate on its support, and means for illuminating the printing plate.

40. In a photographic printing apparatus, the combination of a support for a sensitized plate, a support for a photographic printing plate, one of said supports being adjustable relative to the other for placing the printing plate in different printing relations to the sensitized plate, means for causing close contact of the printing plate with the sensitized plate, means for adjustably securing the printing plate on its support, registering means mounted in said apparatus, said registering means and printing plate support being movable to positions in which the former overlies the latter in predetermined relation to said printing plate support and coöperates with the printing plate for accurately positioning the printing plate on its support, and means for illuminating the printing plate.

41. In a photographic printing apparatus, the combination of a support for a sensitized plate, a support for a photographic printing plate, one of said supports being adjustable relative to the other for placing the printing plate in different printing relations to the sensitized plate, means for causing close contact of the printing plate with the sensitized plate, means for adjustably securing the printing plate on its support, registering means mounted in said apparatus, said registering means and printing plate support being hinged to swing to positions in which the former overlies the latter in predetermined relation to said printing plate support and coöperates with the printing plate for accurately positioning the printing plate on its support, and means for illuminating the printing plate.

42. The combination with a printing plate holder provided with means for adjustably securing a printing plate therein, of means for accurately positioning the printing plate in the holder comprising a transparent plate adjustable over the face of the printing plate in predetermined relation to said holder and having a mark adapted to register with a register mark on the printing plate.

43. The combination with a printing plate holder provided with means for adjustably securing a printing plate therein, of means for accurately positioning the printing plate in the holder comprising a transparent plate adjustable over the face of the printing plate in predetermined relation to said holder and adjustable toward the printing plate into close relation thereto, and having a mark adapted to register with a register mark on the printing plate.

44. In a photographic printing apparatus in which rigid sensitized and printing plates are adapted to contact face to face, the combination of a support for one of said plates, a holder provided with means for securing said other plate thereon, a supporting frame, means flexibly supporting said holder in said frame and permitting the holder to assume different angular positions in the frame to cause said rigid plates to bear flat against each other, and means for causing close contact between said sensitized and printing plates.

45. In a photographic printing apparatus in which rigid sensitized and printing plates are adapted to contact face to face, the combination of a support for one of said plates, a holder provided with adjustable means for adjustably securing said other plate thereon, a supporting frame, flexible members supporting said holder in said frame and permitting the holder to assume different angular positions in the frame to cause said rigid plates to bear flat against each other, and means for causing close contact between said sensitized and printing plates.

46. In a photographic printing apparatus in which rigid sensitized and printing plates are adapted to contact face to face, a support for one of said plates, a holder provided with means for securing said other plate thereon, flexible supporting members attached to opposite edges of said holder, a supporting frame, said flexible members permitting the holder to assume different angular positions in the frame to cause said rigid plates to bear flat against each other, means for securing said flexible members on said frame to support said holder therein, and means for causing close contact between said sensitized and printing plates.

47. In a photographic printing apparatus, the combination of a support for a sensitized plate, a support for a photographic printing plate, one of said supports being adjustable relative to the other for placing the printing plate in different operative printing relations to the sensitized plate, means for causing close contact of the printing and sensitized plates, means for adjustably securing the printing plate on its support, said support being movable away from the sensitized plate to an inoperative position, registering means movable to a position overlying said printing plate in a predetermined relation thereto when the printing plate is in said inoperative position and coöperating with said printing plate to enable the printing plate to be accurately positioned on its support, said registering means being movable away from said printing plate to permit said printing plate to be moved to its operative relation to said sensitized plate and permit the unobstructed illumination of said printing plate, and means for illuminating the printing plate.

48. In a photographic printing apparatus, the combination of a support for a sensitized plate, a support for a photographic printing plate, one of said supports being adjustable relative to the other for placing the printing plate in different operative printing relations to the sensitized plate, means for causing close contact of the printing and sensitized plates, means for adjustably securing the printing plate on its support, said printing plate support being hinged to swing away from the sensitized plate for placing said printing plate in an inoperative position, registering means arranged to swing to a position overlying said printing plate when the printing plate is in said inoperative position and coöperate with said printing plate for accurately positioning the printing plate on its support, and said registering means being adapted to swing away from said printing plate to permit said printing plate support to swing to its operative relation to the sensitized plate and permit the unobstructed illumination of said printing plate, and means for illuminating the printing plate.

49. In a photographic printing apparatus, the combination of a holder for a sensitized plate, a support for a transparent printing plate normally held stationary in front of said sensitized plate holder, means for moving said holder to place the sensitized plate into and out of contact with the printing plate, and pressure means for causing an intimate contact of the sensitized and printing plates, said printing plate support being movable away from its normal position in front of the sensitized plate to afford access to said sensitized plate.

50. In a photographic printing apparatus, the combination of a holder for a sensitized plate, a support for a transparent printing plate normally held stationary in front of said sensitized plate holder, means for adjusting said holder to locate different portions of the sensitized plate opposite the printing plate, means for moving said holder to place the sensitized plate into and out of contact with the printing plate, and pressure means for causing an intimate contact of the sensitized and printing plates, said printing plate support being movable away from its normal position in front of the sensitized plate to afford access to said sensitized plate.

51. In a photographic printing apparatus, the combination of a holder for a sensitized plate, a support for a transparent printing plate normally held stationary in front of said sensitized plate holder, means for moving said holder to place the sensitized plate into and out of contact with the printing plate, and pressure means for causing an intimate contact of the sensitized and printing plates, said printing plate support being hinged to swing out from its normal position in front of the sensitized plate to afford access to said sensitized plate.

52. In a photographic printing apparatus, the combination of a holder provided with means for securing and stretching a sensitized printing plate in upright position, a holder provided with securing means for supporting a photographic printing plate in an upright position opposite said sensitized plate, said first holder being adjustable parallel with the surface of the sensitized plate and said second holder being rotatably adjustable parallel with said surface for placing the printing plate in different operative printing relations to the sensitized plate, one of said holders being also movable toward and from the other for placing said plates into and out of contact, a pressure device for causing intimate contact of the sensitized and printing plates, said printing plate holder and pressure device being located at opposite sides of the sensitized plate, means for adjusting said pressure device substantially parallel with the surface of the sensitized plate so that it will be directly opposite the printing plate in the different adjustments of the printing and sensitized plates, and means for illuminating the printing plate.

53. In a photographic printing apparatus, the combination of a holder provided with means for securing and stretching a sensitized printing plate in upright position, a holder provided with securing means for supporting a photographic printing plate in an upright position opposite said sensitized plate, said first holder being adjustable parallel with the surface of the sensitized plate and said second holder being rotatably adjustable parallel with said surface for placing the printing plate in different operative printing relations to the sensitized plate, and said printing plate holder being movable away from said sensitized plate to a position in which the plate is readily accessible for adjusting, securing and removing it, a pressure device for causing intimate contact of the sensitized and printing plates, said printing plate holder and pressure device being located at opposite sides of the sensitized plate, means for adjusting said pressure device substantially parallel with the surface of the sensitized plate so that it will be directly opposite the printing plate in the different adjustments of the printing and sensitized plates, and means for illuminating the printing plate.

54. In a photographic contact printing apparatus, the combination of means for supporting a photographic printing plate, a holder for supporting a thin sensitized plate in contact with said printing plate, said holder comprising parallel holding members for opposite edges of the sensitized plate provided with means for securing the edges of the plate thereto, means for relatively spreading said members to make the plate taut, said holding members having edges on which the plate bears and which hold the plate with its sensitized surface in a plane disposed outwardly beyond the plate-securing means and the other parts of the holder, and means for illuminating the printing plate.

55. In a photographic printing apparatus, the combination of supports for a sensitized plate and for a printing plate, one of said supports being adjustable relatively to the other substantially parallel with the plane of the sensitized plate for placing the printing plate opposite different portions of the sensitized plate, and one of said supports being movable for placing said plates into and out of contact, means for causing an intimate contact of said plates including a pressure member, means for adjusting said member substantially parallel with the plane of the sensitized plate and relatively to the printing plate for locating the printing plate and pressure member with their centers in different relations to each other, and means for illuminating the printing plate.

56. In a photographic printing apparatus, the combination of supports for a sensitized plate and for a printing plate, one of said supports being adjustable relatively to the other substantially parallel with the plane of the sensitized plate for placing the printing plate opposite different portions of the sensitized plate, and one of said supports being movable for placing said plates into and out of contact, means for causing an intimate contact of said plates including a pressure member, means for effecting an adjustment of said pressure member and printing plate relatively to each other substantially parallel with the plane of the sensitized plate for locating the printing plate and pressure members with their centers in different relations to each other in different adjustments of the printing and sensitized plates, and means for illuminating the printing plate.

57. In a photographic printing apparatus, the combination of supports for a sensitized plate and for a printing plate, one of said supports being adjustable relatively to the other substantially parallel with the plane of the sensitized plate for placing the printing plate opposite different portions of the sensitized plate, and one of said supports being movable for placing said plates into and out of contact, means for causing an intimate contact of said plates including a pressure member, means for adjusting said member in different directions at an angle to each other substantially parallel with the plane of the sensitized plate and relatively to both the printing plate and the sensitized plate for locating the printing plate and pressure member with their centers in different relations to each other, and means for illuminating the printing plate.

Witness my hand this 5th day of August, 1918.

WILLIAM C. HUEBNER.

Witnesses:
M. J. PITMAN,
C. W. PARKER.